US011710105B2

United States Patent
Luke

(10) Patent No.: US 11,710,105 B2
(45) Date of Patent: Jul. 25, 2023

(54) APPARATUS, METHOD AND ARTICLE FOR CHANGING PORTABLE ELECTRICAL POWER STORAGE DEVICE EXCHANGE PLANS

(71) Applicant: Gogoro Inc., Hong Kong (CN)

(72) Inventor: Hok-Sum Horace Luke, Mercer Island, WA (US)

(73) Assignee: Gogoro Inc., Hong Kong (CN)

( * ) Notice: Subject to any disclaimer, the term of this patent is extended or adjusted under 35 U.S.C. 154(b) by 268 days.

(21) Appl. No.: 14/204,857

(22) Filed: Mar. 11, 2014

(65) Prior Publication Data

US 2014/0279576 A1    Sep. 18, 2014

Related U.S. Application Data

(60) Provisional application No. 61/778,038, filed on Mar. 12, 2013.

(51) Int. Cl.
*G06Q 10/30* (2023.01)
*G07F 7/06* (2006.01)
*G07F 15/00* (2006.01)

(52) U.S. Cl.
CPC .............. *G06Q 10/30* (2013.01); *G07F 7/06* (2013.01); *G07F 15/006* (2013.01); *Y02W 90/00* (2015.05)

(58) Field of Classification Search
None
See application file for complete search history.

(56) References Cited

U.S. PATENT DOCUMENTS 1,387,848 A    8/1921  Good
3,470,974 A    10/1969 Pefine
(Continued)

FOREIGN PATENT DOCUMENTS

CA    2 865 976     9/2013
CN    101683872     3/2010
(Continued)

OTHER PUBLICATIONS

Squatrigilia, "Better Place Unveils an Electric Car Battery Swap Station," wired.com, May 13, 2009, available online at https://www.wired.com/2009/05/better-place/ (Year: 2009).*
(Continued)

*Primary Examiner* — Jan P Mincarelli
(74) *Attorney, Agent, or Firm* — Perkins Coie LLP

(57) ABSTRACT

A network of collection, charging and/or distribution machines collect, charge and/or distribute portable electrical energy storage devices (e.g., batteries, supercapacitors or ultracapacitors). In some embodiments, if the user selects to change their current portable electrical power storage device exchange plan to a two-portable electrical power storage device exchange plan while exchanging their current portable electrical power storage device, the user will return their current portable electrical power storage device and will receive two portable electrical power storage devices in exchange at the collection, charging and distribution machine. The user may also be required to pay additional fees and/or commit to additional obligations while at the collection, charging and distribution machine in order to change to the different portable electrical power storage device exchange plan.

18 Claims, 9 Drawing Sheets

(56) References Cited

U.S. PATENT DOCUMENTS

| | | | |
|---|---|---|---|
| 3,664,450 A | 5/1972 | Udden et al. | |
| 3,678,455 A | 7/1972 | Levey | |
| 4,087,895 A | 5/1978 | Etienne | |
| 4,129,759 A | 12/1978 | Hug | |
| 4,216,839 A | 8/1980 | Gould et al. | |
| 4,669,570 A | 6/1987 | Perret | |
| 5,187,423 A | 2/1993 | Marton | |
| 5,189,325 A | 2/1993 | Jarczynski | |
| 5,236,069 A | 8/1993 | Peng | |
| 5,339,250 A | 8/1994 | Durbin | |
| 5,349,535 A | 9/1994 | Gupta | |
| 5,376,869 A | 12/1994 | Konrad | |
| 5,544,784 A | 8/1996 | Malaspina | |
| 5,596,261 A | 1/1997 | Suyama | |
| 5,627,752 A | 5/1997 | Buck et al. | |
| 5,631,536 A | 5/1997 | Tseng | |
| 5,642,270 A | 6/1997 | Green et al. | |
| 5,815,824 A | 9/1998 | Saga et al. | |
| 5,839,800 A | 11/1998 | Koga et al. | |
| 5,898,282 A | 4/1999 | Drozdz et al. | |
| 5,998,963 A | 12/1999 | Aarseth | |
| 6,016,882 A | 1/2000 | Ishikawa | |
| 6,154,006 A | 11/2000 | Hatanaka et al. | |
| 6,177,867 B1 | 1/2001 | Simon et al. | |
| 6,177,879 B1 | 1/2001 | Kokubu et al. | |
| 6,236,333 B1 | 5/2001 | King | |
| 6,403,251 B1 | 6/2002 | Baggaley et al. | |
| 6,498,457 B1 | 12/2002 | Tsuboi | |
| 6,515,580 B1 | 2/2003 | Isoda et al. | |
| 6,583,592 B2 | 6/2003 | Omata et al. | |
| 6,593,713 B2 | 7/2003 | Morimoto et al. | |
| 6,796,396 B2 | 9/2004 | Kamen et al. | |
| 6,822,560 B2 | 11/2004 | Geber et al. | |
| 6,854,773 B2 | 2/2005 | Lin | |
| 6,899,268 B2 | 5/2005 | Hara | |
| 6,952,795 B2 | 10/2005 | O'Gorman et al. | |
| 7,010,682 B2 | 3/2006 | Reinold et al. | |
| 7,131,005 B2 | 10/2006 | Levenson et al. | |
| 7,392,068 B2 | 6/2008 | Dayan et al. | |
| 7,415,332 B2 | 8/2008 | Ito et al. | |
| 7,426,910 B2 | 9/2008 | Elwart | |
| 7,495,543 B2 | 2/2009 | Denison et al. | |
| 7,567,166 B2 | 7/2009 | Bourgine De Meder | |
| 7,592,728 B2 | 9/2009 | Jones et al. | |
| 7,596,709 B2 | 9/2009 | Cooper et al. | |
| 7,617,893 B2 | 11/2009 | Syed et al. | |
| 7,698,044 B2 | 4/2010 | Prakash et al. | |
| 7,728,548 B2 | 6/2010 | Daynes et al. | |
| 7,761,307 B2 | 7/2010 | Ochi et al. | |
| 7,778,746 B2 | 8/2010 | McLeod et al. | |
| 7,863,858 B2 | 1/2011 | Gangstoe et al. | |
| 7,868,591 B2 | 1/2011 | Phillips et al. | |
| 7,898,439 B2 | 3/2011 | Bettez et al. | |
| 7,908,020 B2 | 3/2011 | Pieronek | |
| 7,923,144 B2 | 4/2011 | Kohn et al. | |
| 7,948,207 B2 | 5/2011 | Scheucher | |
| 7,979,147 B1 | 7/2011 | Dunn | |
| 7,993,155 B2 | 8/2011 | Heichal et al. | |
| 8,006,793 B2 | 8/2011 | Heichal et al. | |
| 8,006,973 B2 | 8/2011 | Toba et al. | |
| 8,013,571 B2 | 9/2011 | Agassi et al. | |
| 8,035,341 B2 | 10/2011 | Genzel et al. | |
| 8,035,349 B2 | 10/2011 | Lubawy | |
| 8,063,762 B2 | 11/2011 | Sid | |
| 8,068,952 B2 | 11/2011 | Valentine et al. | |
| 8,106,631 B2 | 1/2012 | Abe | |
| 8,118,132 B2 | 2/2012 | Gray, Jr. | |
| 8,164,300 B2 | 4/2012 | Agassi et al. | |
| 8,219,839 B2 | 7/2012 | Akimoto | |
| 8,229,625 B2 | 7/2012 | Lal et al. | |
| 8,265,816 B1 | 9/2012 | LaFrance | |
| 8,301,365 B2 | 10/2012 | Niwa et al. | |
| 8,319,605 B2 | 11/2012 | Hassan et al. | |
| 8,326,259 B2 | 12/2012 | Gautama et al. | |
| 8,354,768 B2 | 1/2013 | Cipriani | |
| 8,355,965 B2 | 1/2013 | Yamada | |
| 8,378,627 B2 | 2/2013 | Asada et al. | |
| 8,412,401 B2 | 4/2013 | Bertosa et al. | |
| 8,437,908 B2 | 5/2013 | Goff et al. | |
| 8,447,598 B2 | 5/2013 | Chutorash et al. | |
| 8,497,660 B2* | 7/2013 | Soong | G07F 15/005 320/106 |
| 8,614,565 B2 | 12/2013 | Lubawy | |
| 8,725,135 B2 | 5/2014 | Weyl | |
| 2001/0018903 A1 | 9/2001 | Hirose et al. | |
| 2002/0023789 A1 | 2/2002 | Morisawa et al. | |
| 2002/0070851 A1 | 6/2002 | Raichle et al. | |
| 2003/0141840 A1 | 7/2003 | Sanders | |
| 2003/0163434 A1 | 8/2003 | Barends | |
| 2003/0209375 A1* | 11/2003 | Suzuki | B60K 1/04 180/65.22 |
| 2004/0236615 A1 | 11/2004 | Msndy | |
| 2004/0246119 A1 | 12/2004 | Martin et al. | |
| 2006/0047380 A1 | 3/2006 | Welch | |
| 2006/0208850 A1 | 9/2006 | Ikeuchi et al. | |
| 2006/0284601 A1 | 12/2006 | Salasoo et al. | |
| 2007/0026996 A1 | 2/2007 | Ayabe et al. | |
| 2007/0035397 A1 | 2/2007 | Patenaude et al. | |
| 2007/0069687 A1 | 3/2007 | Suzuki | |
| 2007/0090921 A1 | 4/2007 | Fisher | |
| 2007/0145945 A1 | 6/2007 | McGinley et al. | |
| 2007/0159297 A1 | 7/2007 | Paulk et al. | |
| 2007/0208468 A1 | 9/2007 | Sankaran et al. | |
| 2008/0276110 A1 | 11/2008 | Indiani et al. | |
| 2008/0281732 A1* | 11/2008 | Yamada | G06Q 10/30 705/30 |
| 2009/0024872 A1 | 1/2009 | Beverly | |
| 2009/0033456 A1 | 2/2009 | Castillo et al. | |
| 2009/0082957 A1 | 3/2009 | Agassi et al. | |
| 2009/0112394 A1 | 4/2009 | Lepejian et al. | |
| 2009/0158790 A1 | 6/2009 | Oliver | |
| 2009/0198372 A1* | 8/2009 | Hammerslag | G07F 15/005 700/226 |
| 2009/0294188 A1 | 12/2009 | Cole | |
| 2010/0026238 A1 | 2/2010 | Suzuki et al. | |
| 2010/0051363 A1 | 3/2010 | Inoue et al. | |
| 2010/0052588 A1 | 3/2010 | Okamura et al. | |
| 2010/0089547 A1 | 4/2010 | King et al. | |
| 2010/0094496 A1 | 4/2010 | Hershkovitz et al. | |
| 2010/0114798 A1 | 5/2010 | Sirton | |
| 2010/0114800 A1 | 5/2010 | Yasuda et al. | |
| 2010/0161481 A1 | 6/2010 | Littrell | |
| 2010/0198535 A1 | 8/2010 | Brown et al. | |
| 2010/0198754 A1 | 8/2010 | Jones et al. | |
| 2010/0201482 A1 | 8/2010 | Robertson et al. | |
| 2010/0235043 A1 | 9/2010 | Seta et al. | |
| 2010/0308989 A1 | 12/2010 | Gasper | |
| 2011/0025267 A1 | 2/2011 | Kamen et al. | |
| 2011/0029157 A1 | 2/2011 | Muzaffer | |
| 2011/0032110 A1 | 2/2011 | Taguchi | |
| 2011/0071932 A1 | 3/2011 | Agassi et al. | |
| 2011/0082621 A1 | 4/2011 | Berkobin et al. | |
| 2011/0106329 A1 | 5/2011 | Donnelly et al. | |
| 2011/0112710 A1 | 5/2011 | Meyer-Ebeling et al. | |
| 2011/0112717 A1* | 5/2011 | Resner | G07C 5/008 701/31.4 |
| 2011/0114798 A1 | 5/2011 | Gemmati | |
| 2011/0120789 A1 | 5/2011 | Teraya | |
| 2011/0148346 A1 | 6/2011 | Gagosz et al. | |
| 2011/0153141 A1 | 6/2011 | Beechie et al. | |
| 2011/0160992 A1 | 6/2011 | Crombez | |
| 2011/0169447 A1 | 7/2011 | Brown et al. | |
| 2011/0200193 A1 | 8/2011 | Blitz et al. | |
| 2011/0202476 A1 | 8/2011 | Nagy et al. | |
| 2011/0218703 A1 | 9/2011 | Uchida | |
| 2011/0224900 A1 | 9/2011 | Hiruta et al. | |
| 2011/0241824 A1 | 10/2011 | Uesugi | |
| 2011/0260691 A1 | 10/2011 | Ishibashi et al. | |
| 2011/0270480 A1 | 11/2011 | Ishibashi et al. | |
| 2011/0279257 A1 | 11/2011 | Au et al. | |
| 2011/0292667 A1 | 12/2011 | Meyers | |
| 2011/0295454 A1 | 12/2011 | Meyers | |
| 2011/0303509 A1 | 12/2011 | Agassi et al. | |
| 2012/0000720 A1 | 1/2012 | Honda et al. | |

(56) References Cited

U.S. PATENT DOCUMENTS

| | | |
|---|---|---|
| 2012/0013182 A1 | 1/2012 | Minegishi et al. |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0157083 A1 | 6/2012 | Otterson |
| 2012/0158229 A1 | 6/2012 | Schaefer |
| 2012/0167071 A1 | 6/2012 | Paek |
| 2012/0194346 A1 | 8/2012 | Tsai et al. |
| 2012/0223575 A1 | 9/2012 | Hachiya et al. |
| 2012/0248868 A1* | 10/2012 | Mobin ................. B60L 3/0046 307/9.1 |
| 2012/0248869 A1 | 10/2012 | Itagaki et al. |
| 2012/0253567 A1 | 10/2012 | Levy et al. |
| 2012/0256588 A1 | 10/2012 | Hayashi et al. |
| 2012/0259665 A1 | 10/2012 | Pandhi et al. |
| 2012/0271723 A1 | 10/2012 | Penilla et al. |
| 2012/0280573 A1 | 11/2012 | Ohkura et al. |
| 2012/0296512 A1 | 11/2012 | Lee et al. |
| 2012/0299537 A1 | 11/2012 | Kikuchi |
| 2012/0299721 A1 | 11/2012 | Jones |
| 2012/0316671 A1 | 12/2012 | Hammerslag et al. |
| 2013/0024306 A1 | 1/2013 | Shah et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119129 A1* | 5/2013 | Amdahl ................ G06Q 20/385 235/381 |
| 2013/0119898 A1 | 5/2013 | Ohkura |
| 2013/0127416 A1 | 5/2013 | Kamer et al. |
| 2013/0132307 A1 | 5/2013 | Phelps et al. |
| 2013/0138542 A1* | 5/2013 | Sirton ................ G06Q 10/0631 705/34 |
| 2013/0179061 A1 | 7/2013 | Gadh et al. |
| 2013/0181582 A1 | 7/2013 | Luke et al. |
| 2013/0200845 A1 | 8/2013 | Bito |
| 2013/0254097 A1* | 9/2013 | Marathe ................ G07F 15/005 705/39 |
| 2013/0282254 A1 | 10/2013 | Dwan et al. |
| 2014/0028089 A1 | 1/2014 | Luke et al. |
| 2014/0121829 A1* | 5/2014 | Gospodarek ............ G07F 11/62 700/236 |
| 2014/0163813 A1 | 6/2014 | Chen et al. |
| 2014/0368032 A1 | 12/2014 | Doemdorfer |

FOREIGN PATENT DOCUMENTS

| | | |
|---|---|---|
| DE | 44 32 539 | 6/1995 |
| EP | 0 693 813 A1 | 1/1996 |
| EP | 1 177 955 A2 | 2/2002 |
| EP | 2 101 390 A2 | 9/2009 |
| EP | 2157552 A1 | 2/2010 |
| EP | 2 230 146 A2 | 9/2010 |
| EP | 2 428 939 A1 | 3/2012 |
| JP | 07-031008 A | 1/1995 |
| JP | 7-36504 U | 7/1995 |
| JP | 9-119839 A | 5/1997 |
| JP | 10-170293 A | 6/1998 |
| JP | 10-307952 A | 11/1998 |
| JP | 11-049079 | 2/1999 |
| JP | 11-51681 A | 2/1999 |
| JP | 11-176487 A | 7/1999 |
| JP | 11-205914 A | 7/1999 |
| JP | 2000-102102 A | 4/2000 |
| JP | 2000-102103 A | 4/2000 |
| JP | 2000-341868 A | 12/2000 |
| JP | 2001-128301 | 5/2001 |
| JP | 2003-118397 | 4/2003 |
| JP | 2003-262525 A | 9/2003 |
| JP | 2005-67453 A | 3/2005 |
| JP | 2006-121874 A | 5/2006 |
| JP | 2007-60353 A | 3/2007 |
| JP | 2008-127894 A | 6/2008 |
| JP | 2008-219953 A | 9/2008 |
| JP | 2009-512035 A | 3/2009 |
| JP | 2009-171646 A | 7/2009 |
| JP | 2009-171647 A | 7/2009 |
| JP | 4319289 B2 | 8/2009 |
| JP | 2010-022148 A | 1/2010 |
| JP | 2010-191636 A | 9/2010 |
| JP | 2010-200405 A | 9/2010 |
| JP | 2010-269686 A | 12/2010 |
| JP | 2010-540907 A | 12/2010 |
| JP | 2011-126452 | 6/2011 |
| JP | 2011-131631 A | 7/2011 |
| JP | 2011-131805 A | 7/2011 |
| JP | 2011-142704 A | 7/2011 |
| JP | 2011-233470 A | 11/2011 |
| JP | 2012-151916 A | 8/2012 |
| KR | 1998-045020 U | 9/1998 |
| KR | 2004-0005146 A | 1/2004 |
| KR | 20100012401 A | 2/2010 |
| KR | 10-0971278 | 7/2010 |
| KR | 20110004292 A | 1/2011 |
| KR | 20110041783 A | 4/2011 |
| KR | 20120020554 A | 3/2012 |
| TW | 200836452 A | 9/2008 |
| TW | I315116 B | 9/2009 |
| TW | M371880 U1 | 1/2010 |
| TW | M379269 U1 | 4/2010 |
| TW | M379789 U1 | 5/2010 |
| TW | M385047 U1 | 7/2010 |
| TW | 201043986 A1 | 12/2010 |
| TW | 201044266 A1 | 12/2010 |
| TW | 201319993 A1 | 5/2013 |
| WO | 98/21132 A1 | 5/1998 |
| WO | 2009/039454 A2 | 3/2009 |
| WO | 2010/033517 A2 | 3/2010 |
| WO | 2010/033881 A1 | 3/2010 |
| WO | 2010/143483 A1 | 12/2010 |
| WO | 2011/138205 A1 | 11/2011 |
| WO | 2012/085992 A1 | 6/2012 |
| WO | 2012/160407 A1 | 11/2012 |
| WO | 2012/160557 A2 | 11/2012 |
| WO | 2013/016555 A2 | 1/2013 |
| WO | 2013/024483 A2 | 2/2013 |
| WO | 2013/024484 A1 | 2/2013 |
| WO | 2013/042216 A1 | 3/2013 |
| WO | 2013/074819 A1 | 5/2013 |
| WO | 2013/080211 A1 | 6/2013 |
| WO | 2013/102894 A1 | 7/2013 |
| WO | 2013/108246 A2 | 7/2013 |
| WO | 2013/118113 A2 | 8/2013 |
| WO | 2013/128007 A2 | 9/2013 |
| WO | 2013/128009 A2 | 9/2013 |
| WO | 2013/128009 A3 | 9/2013 |

(56) References Cited

FOREIGN PATENT DOCUMENTS

WO  2013/142154 A1  9/2013
WO  2013/144951 A1  10/2013

OTHER PUBLICATIONS

Extended European Search Report dated Aug. 12, 2016 for corresponding EP Application No. 14780146.8, 9 pages.
Taiwanese Office Action with English Translation dated Sep. 19, 2016, for corresponding TW Application No. 103108477, 14 pages.
Chen et al., "Apparatus, Method and Article for Providing Vehicle Diagnostic Data," Notice of Allowance dated Nov. 3, 2014, for U.S. Appl. No. 13/559,390, 10 pages.
Chen et al., "Systems and Methods for Powering Electric Vehicles Using a Single of Multiple Power Cells," U.S. Appl. No. 14/453,156, filed Aug. 6, 2014, 46 pages.
International Search Report and Written Opinion for corresponding International Application No. PCT/US2013/065704, dated Feb. 13, 2014, 13 pages.
International Search Report and Written Opinion for corresponding International Application No. PCT/US2014/050001, dated Nov. 18, 2014, 9 pages.
Japanese Office Action with English Translation, dated Dec. 16, 2014, for corresponding JP Application No. 2014-523013, 11 pages.
Luke et al., "Detectible Indication of an Electric Motor Vehicle Standby Mode," Notice of Allowance dated Apr. 10, 2014, for U.S. Appl. No. 13/646,320, 8 pages.
Luke et al., "Dynamically Limiting Vehicle Operation for Best Effort Economy," Office Action for U.S. Appl. No. 13/559,264, dated Jan. 21, 2015, 31 pages.
Luke, "Apparatus, Method and Article for Providing Information Regarding a Vehicle Via a Mobile Device," Office Action for U.S. Appl. No. 14/017,081, dated Dec. 31, 2014, 59 pages.
Taylor et al., "Apparatus, Method and Article for Physical Security of Power Storage Devices In Vehicles," Office Action dated Dec. 10, 2014, for U.S. Appl. No. 14/012,845, 13 pages.
Wu et al., "Apparatus, Method and Article for Security of Vehicles," Office Action dated Oct. 2, 2014, for U.S. Appl. No. 13/671,144, 20 pages.
Wu et al., "Apparatus, Method and Article for Providing to a User Device Information Regarding Availability of Portable Electrical Energy Storage Devices at a Portable Electrical Storage Device Collection, Charging and Distribution Machine," U.S. Appl. No. 14/511,137, dated Oct. 9, 2014, 56 pages.
Wu et al., "Apparatus, Method and Article for Providing Locations of Power Storage Device Collection, Charging and Distribution Machines," Notice of Allowance dated Nov. 25, 2014, for U.S. Appl. No. 14/022,147, 5 pages.
"Inrunner," retreived from URL=http://en.wikipedia.org/w/index.php?title=Inrunner&printable=yes on Sep. 28, 2011, 1 page.
"Outrunner," retreived from URL=http://en.wikipedia.org/w/index.php?title=Outrunner&printable=yes on Sep. 16, 2011, 2 pages.
Chen et al., "Adjusting Electric Vehicle Systems Based on an Electrical Energy Storage Device Thermal Profile," U.S. Appl. No. 61/862,854, filed Aug. 6, 2013, 74 pages.
Chen et al., "Apparatus, Method and Article for Providing Vehicle Diagnostic Data," Office Action dated Apr. 9, 2014, for U.S. Appl. No. 14/022,134, 20 pages.
Chen et al., "Apparatus, Method and Article for Providing Vehicle Diagnostic Data," Notice of Allowance dated Jul. 9, 2014, for U.S. Appl. No. 14/022,134, 10 pages.
Chen et al., "Apparatus, Method and Article for Providing Vehicle Diagnostic Data," Office Action dated Jun. 18, 2014, for U.S. Appl. No. 13/559,390, 16 pages.
Chen et al., "Systems and Methods for Powering Electric Vehicles Using a Single or Multiple Power Cells," U.S. Appl. No. 61/862,852, filed Aug. 6, 2013, 46 pages.

International Search Report and Written Opinion for corresponding International Patent Application No. PCT/US2012/048344, dated Feb. 28, 2013, 9 pages.
International Search Report and Written Opinion for corresponding International Application No. PCT/US2012/059931, dated Mar. 29, 2013, 13 pages.
International Search Report and Written Opinion, for corresponding International Application No. PCT/US2014/021369, dated Jul. 2, 2014, 14 pages.
International Search Report and Written Opinion, for corresponding International Application No. PCT/US2014/022610, dated Jul. 10, 2014, 12 pages.
International Search Report and Written Opinion for corresponding International Application No. PCT/US2014/024757, dated Jul. 11, 2014, 15 pages.
International Search Report and Written Opinion for corresponding International Application No. PCT/US2014/023539, dated Sep. 4, 2014, 12 pages.
Luke et al., "Portable Electrical Energy Storage Device," U.S. Appl. No. 61/872,126, filed Aug. 30, 2013, 39 pages.
Luke et al., "Apparatus, Method and Article for Authentication, Security and Control of Portable Charging Devices and Power Storage Devices, Such as Batteries," Office Action dated Jun. 26, 2014, for U.S. Appl. No. 14/017,090, 19 pages.
Luke et al., "Electric Device Drive Assembly and Cooling System," U.S. Appl. No. 61/615,144, filed Mar. 23, 2012, 43 pages.
Luke et al., "Apparatus, Method and Article for Authentication, Security and Control of Power Storage Devices, Such as Batteries," Office Action dated Aug. 19, 2014, for U.S. Appl. No. 13/559,038, 14 pages.
Luke et al., "Apparatus, Method and Article for Authentication, Security and Control of Power Storage Devices, Such as Batteries," Office Action dated Aug. 21, 2014, for U.S. Appl. No. 14/023,344, 13 pages.
Luke et al., "Dynamically Limiting Vehicle Operation for Best Effort Economy," Office Action for U.S. Appl. No. 13/559,264, dated Aug. 19, 2014, 26 pages.
Luke et al., "Thermal Management of Components in Electric Motor Drive Vehicles," Office Action dated Apr. 2, 2014, for U.S. Appl. No. 13/559,259, 11 pages.
Luke, "Apparatus, Method and Article for Providing Information Regarding a Vehicle Via a Mobile Device," Office Action dated Jul. 21, 2014, for U.S. Appl. No. 14/017,081, 42 pages.
Microchip, "AN885: Brushless DC (BLDC) Motor Fundamentals," Microchip Technology Inc., 2003, 19 pages.
Wu et al., "Apparatus, Method and Article for a Power Storage Device Compartment," Office Action dated Sep. 9, 2014, for U.S. Appl. No. 13/559,125, 28 pages.
Wu et al., "Apparatus, Method and Article for Providing to a User Device Information Regarding Availability of Portable Electrical Energy Storage Devices at a Portable Electrical Energy Storage Device Collection, Charging and Distribution Machine," Notice of Allowance dated Jun. 30, 2014, for U.S. Appl. No. 14/022,140, 5 pages.
Wu et al., "Apparatus, Method and Article for Providing Locations of Power Storage Device Collection, Charging and Distribution Machines," Notice of Allowance dated Jul. 10, 2014, for U.S. Appl. No. 13/559,333, 9 pages.
Wu et al., "Apparatus, Method and Article for Providing Locations of Power Storage Device Collection, Charging and Distribution Machines," Office Action dated Aug. 6, 2014, for U.S. Appl. No. 14/022,147, 17 pages.
Wu et al., "Apparatus, Method and Article for Power Storage Device Failure Safety," U.S. Appl. No. 14/071,134, filed Nov. 4, 2013, 68 pages.
Wu et al., "Apparatus, Method and Article for Power Storage Device Failure Safety," Office Action for U.S. Appl. No. 14/071,134, dated Feb. 12, 2014, 14 pages.
Wu et al., "Apparatus, Method and Article for Power Storage Device Failure Safety," Office Action dated Jun. 9, 2014, for U.S. Appl. No. 14/071,134, 15 pages.

(56) References Cited

OTHER PUBLICATIONS

Chen et al., Apparatus, System, and Method for Authentication of Vehicular Components U.S. Appl. No. 61/783,041, filed Mar. 14, 2013, 84 pages.
Chen et al., "Apparatus, System, and Method for Authentication of Vehicular Components," Office Action dated Nov. 22, 2013, for U.S. Appl. No. 13/918,703, 35 pages.
Chen et al., "Apparatus, System, and Method for Authentication of Vehicular Components," Notice of Allowance dated Mar. 25, 2014, for U.S. Appl. No. 13/918,703, 7 pages.
Chen et al., "Apparatus, System, and Method for Authentication of Vehicular Components," U.S. Appl. No. 13/918,703, filed Jun. 14, 2013, 84 pages.
Chen et al., "Apparatus, Method and Article for Providing Vehicle Diagnostic Data," Office Action dated Dec. 30, 2013, for U.S. Appl. No. 14/022,134, 20 pages.
Chen et al., "Apparatus, Method and Article for Providing Vehicle Diagnostic Data," U.S. Appl. No. 14/022,134, filed Sep. 9, 2013, 61 pages.
Chen et al., "Apparatus, Method and Article for Providing Vehicle Diagnostic Data," U.S. Appl. No. 61/601,404, filed Feb. 21, 2012, 56 pages.
Communication pursuant to Rules 161 (2) and 162 EPC, for corresponding European Patent Application No. 12817273.1, dated Mar. 25, 2014, 3 pages.
Communication pursuant to Rules 161 (2) and 162 EPC, for corresponding European Patent Application No. 12817141.0, dated Mar. 26, 2014, 3 pages.
Communication pursuant to Rules 161 (2) and 162 EPC, for corresponding European Patent Application No. 12818308.4, dated Mar. 26, 2014, 3 pages.
Communication pursuant to Rules 161 (2) and 162 EPC, for corresponding European Patent Application No. 12817696.3, dated Mar. 27, 2014, 3 pages.
Communication pursuant to Rules 161 (2) and 162 EPC, for corresponding European Patent Application No. 12817883.7, dated Mar. 27, 2014, 3 pages.
Communication pursuant to Rules 161 (2) and 162 EPC, for corresponding European Patent Application No. 12818447.0, dated Mar. 27, 2014, 3 pages.
Huang et al., "Apparatus, Method and Article for Vehicle Turn Signals," U.S. Appl. No. 61/727,403, filed Nov. 16, 2012, 41 pages.
Huang et al., "Apparatus, Method and Article for Vehicle Turn Signals," U.S. Appl. No. 14/079,894, filed Nov. 14, 2013, 41 pages.
International Preliminary Report on Patentability and Written Opinion for corresponding International Patent Application No. PCT/US2012/048349, dated Jan. 28, 2014, 5 pages.
International Preliminary Report on Patentability and Written Opinion for corresponding International Patent Application No. PCT/US2012/048354, dated Jan. 28, 2014, 7 pages.
International Preliminary Report on Patentability and Written Opinion for corresponding International Patent Application No. PCT/US2012/048358, dated Jan. 28, 2014, 5 pages.
International Preliminary Report on Patentability and Written Opinion for corresponding International Patent Application No. PCT/US2012/048366, dated Jan. 28, 2014, 5 pages.
International Preliminary Report on Patentability and Written Opinion for corresponding International Patent Application No. PCT/US2012/048367, dated Jan. 28, 2014, 4 pages.
International Preliminary Report on Patentability and Written Opinion for corresponding International Patent Application No. PCT/US2012/048375, dated Jan. 28, 2014, 5 pages.
International Preliminary Report on Patentability and Written Opinion for corresponding International Patent Application No. PCT/US2012/048379, dated Jan. 28, 2014, 5 pages.
International Preliminary Report on Patentability and Written Opinion for corresponding International Patent Application No. PCT/US2012/048380, dated Jan. 28, 2014, 5 pages.
International Preliminary Report on Patentability and Written Opinion for corresponding International Patent Application No. PCT/US2012/048382, dated Jan. 28, 2014, 5 pages.
International Preliminary Report on Patentability and Written Opinion for corresponding International Patent Application No. PCT/US2012/048391, dated Jan. 28, 2014, 6 pages.
International Search Report and Written Opinion for corresponding International Patent Application No. PCT/US2012/048347, dated Dec. 18, 2012, 8 pages.
International Search Report and Written Opinion for corresponding International Patent Application No. PCT/US2012/048349, dated Feb. 18, 2013, 9 pages.
International Search Report and Written Opinion for corresponding International Patent Application No. PCT/US2012/048354, dated Feb. 18, 2013, 11 pages.
International Search Report and Written Opinion for corresponding International Patent Application No. PCT/US2012/048366, dated Jan. 21, 2013, 10 pages.
International Search Report and Written Opinion for corresponding International Patent Application No. PCT/US2012/048367, dated Jan. 17, 2013, 8 pages.
International Search Report and Written Opinion for corresponding International Patent Application No. PCT/US2012/048375, dated Jan. 23, 2013, 9 pages.
International Search Report and Written Opinion for corresponding International Patent Application No. PCT/US2012/048379, dated Dec. 17, 2012, 9 pages.
International Search Report and Written Opinion for corresponding International Patent Application No. PCT/US2012/048380, dated Feb. 27, 2013, 9 pages.
International Search Report and Written Opinion for corresponding International Patent Application No. PCT/US2012/048382, dated Feb. 27, 2013, 9 pages.
International Search Report and Written Opinion for corresponding International Patent Application No. PCT/US2012/063979, dated Mar. 4, 2013, 10 pages.
International Search Report and Written Opinion for corresponding International Application No. PCT/US2012/048391, dated Dec. 21, 2012, 9 pages.
International Search Report and Written Opinion for corresponding International Application No. PCT/US2012/058930, dated Mar. 15, 2013, 11 pages.
International Search Report and Written Opinion for corresponding International Application No. PCT/US2013/070131, dated Feb. 19, 2014, 17 pages.
International Search Report and Written Opinion for corresponding International Patent Application No. PCT/US2012/048358, dated Feb. 25, 2013, 9 pages.
Luke et al., "Apparatus, Method and Article for Authentication, Security and Control of Portable Charging Devices and Power Storage Devices, Such as Batteries," Office Action dated Jan. 6, 2014, for U.S. Appl. No. 14/017,090, 19 pages.
Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," Office Action for U.S. Appl. No. 13/646,320, dated May 30, 2013, 13 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.

(56) References Cited

OTHER PUBLICATIONS

Luke et al., "Drive Assembly for Electric Powered Device," U.S. Appl. No. 61/546,411, filed Oct. 12, 2011, 18 pages.
Luke et al., "Modular System for Collection and Distribution of Electric Storage Devices," U.S. Appl. No. 14/202,589, filed Mar. 10, 2014, 76 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such as Batteries, Based On User Profiles," U.S. Appl. No. 61/534,772, filed Sep. 14, 2011, 55 pages.
Luke et al., "Apparatus, Method and Article for Authentication, Security and Control of Power Storage Devices, Such as Batteries," Office Action dated Feb. 26, 2014, for U.S. Appl. No. 13/559,038, 13 pages.
Luke et al., "Apparatus, Method and Article for Authentication, Security and Control of Power Storage Devices, Such as Batteries," Office Action dated Feb. 25, 2014, for U.S. Appl. No. 14/023,344, 12 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Collection, Charging and Distributing Power Storage Devices, Such as Batteries," U.S. Appl. No. 61/511,900, filed Jul. 26, 2011, 73 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Dynamically Limiting Vehicle Operation for Best Effort Economy," Office Action for U.S. Appl. No. 13/559,264, dated Aug. 14, 2013, 21 pages.
Luke et al., "Dynamically Limiting Vehicle Operation for Best Effort Economy," Office Action for U.S. Appl. No. 13/559,264, dated Feb. 12, 2014, 24 pages.
Luke et al., "Dynamically Limiting Vehicle Operation for Best Effort Economy," U.S. Appl. No. 61/511,880, filed Jul. 26, 2011, 52 pages.
Luke et al., "Thermal Management of Components in Electric Motor Drive Vehicles," U.S. Appl. No. 61/511,887, filed Jul. 26, 2011, 44 pages.
Luke et al., "Thermal Management of Components in Electric Motor Drive Vehicles," U.S. Appl. No. 61/647,941, filed May 16, 2012, 47 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," Office Action for U.S. Appl. No. 14/017,081, dated Jan. 30, 2014, 36 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," U.S. Appl. No. 61/780,781, filed Mar. 13, 2013, 80 pages.

Taylor et al., "Apparatus, Method and Article for Physical Security of Power Storage Devices in Vehicles," Notice of Allowance for U.S. Appl. No. 13/559,054, dated May 30, 2013, 32 pages.
Taylor et al., "Apparatus, Method and Article for Physical Security of Power Storage Devices in Vehicles," Office Action for U.S. Appl. No. 13/559,054, dated Dec. 3, 2012, 11 pages.
Taylor et al., "Apparatus, Method and Article for Physical Security of Power Storage Devices in Vehicles," U.S. Appl. No. 14/012,845, filed Aug. 28, 2013, 64 pages.
Taylor et al., "Apparatus, Method and Article for Physical Security of Power Storage Devices in Vehicles," U.S. Appl. No. 61/557,170, filed Nov. 8, 2011, 60 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," Office Action for U.S. Appl. No. 13/559,125, dated Feb. 24, 2014, 28 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices at a Power Storage Device Collection, Charging and Distribution Machine," Office Action dated Mar. 5, 2014, for U.S. Appl. No. 14/022,140, 8 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Locations of Power Storage Device Collection, Charging and Distribution Machines," Office Action for U.S. Appl. No. 13/559,333, dated Jul. 3, 2013, 14 pages.
Wu et al., "Apparatus, Method and Article for Providing Locations of Power Storage Device Collection, Charging and Distribution Machines," Office Action dated Nov. 19, 2013, for U.S. Appl. No. 14/022,147, 10 pages.
Wu et al., "Apparatus, Method and Article for Providing Locations of Power Storage Device Collection, Charging and Distribution Machines," Office Action dated Nov. 27, 2013, for U.S. Appl. No. 13/559,333, 19 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action dated Mar. 5, 2014, for U.S. Appl. No. 14/022,147, 12 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for Security of Vehicles," U.S. Appl. No. 61/557,176, filed Nov. 8, 2011, 37 pages.
Wu, "Battery Configuration for an Electric Vehicle," U.S. Appl. No. 14/057,405, filed Oct. 18, 2013, 38 pages.
European Exam Report received for European Application No. 14780146.8; Applicant Gogoro, Inc., dated; Jun. 19, 2020, 18 pages.

* cited by examiner

APPARATUS, METHOD AND ARTICLE FOR CHANGING PORTABLE ELECTRICAL POWER STORAGE DEVICE EXCHANGE PLANS

BACKGROUND

Technical Field

The present disclosure generally relates to the distribution of rechargeable electrical power storage devices (e.g., secondary batteries, supercapacitors or ultracapacitors), which may be suitable for use in a variety of fields or applications, for instance transportation and non-transportation uses.

Description of the Related Art

There are a wide variety of uses or applications for portable electrical power storage devices.

One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particularly as compared to automobiles, cars or trucks. Cities with high numbers of combustion engine scooters and/or motorbikes also tend to be very densely populated and suffer from high levels of air pollution. When new, many combustion engine scooters and/or motorbikes provide a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

Zero tail pipe pollution alternatives to combustion engines would greatly benefit air quality, and hence the health of large populations.

While the zero tail pipe emissions benefit of all-electric vehicles are appreciated, adoption of all-electric vehicles by large populations has been slow. One of the reasons appears to be the cost, particularly the cost of secondary batteries. Another one of the reasons appears to be the limited driving range available on a single charge of a battery, limited locations where a secondary battery can be recharged, and the relatively long time (e.g., multiple hours) necessary to recharge a secondary battery when depleted.

The approaches described herein may address some of the issues which have limited adoption of zero tail pipe emission technology, particularly in densely crowded cities, and in populations with limited financial resources.

For example, some of the approaches described herein employ collection, charging and distribution machines, which may be otherwise be termed as kiosks or vending machines, to collect, charge and distribute electrical power storage devices (e.g., batteries, supercapacitors or ultracapacitors). Such machines may be distributed about a city or other region at a variety of locations, such as convenience stores or existing gas or petrol filling stations. Reference to collection machines; collection and distribution machines; collection and charging machines; and distribution machines herein does not mean that such machines do not or cannot have or use additional functionality including but not limited to, one or more of: charging, collection and distribution of electrical storage devices and/or other items.

The collection, charging and distribution machines may maintain a stock of fully charged or almost fully charged electrical storage devices for use by end users. The collection, charging and distribution machines may collect, receive or otherwise accept depleted electrical storage devices, for example as returned by end users, recharging such for reuse by subsequent end users.

Thus, as a battery or other electrical power storage device reaches or approaches the end of its stored charge, an end user may simply replace, exchange or otherwise swap batteries or other electrical power storage devices. This may address issues related to cost, as well as limited range and recharging locations, and relatively long recharging times.

As previously noted, secondary batteries and other electrical power storage devices are relatively expensive. Thus, it is beneficial to stock the least number of electrical power storage devices possible at collection, charging and distribution machines, while still ensuring that demand for such is satisfied.

For these reasons, the ability to have electrical power storage devices available and the management of distributing such electrical power storage devices is important to commercial success of any such endeavor. Thus, a number of approaches are described herein to provide opportunities for a user to change a portable electrical power storage device exchange plan of the user.

A method in a system for changing a portable electrical power storage device exchange plan may be summarized as including: receiving, by one or more computer processors of a portable electrical power storage device exchange plan system, information regarding a user exchanging a portable electrical power storage device of a vehicle; determining, by one or more computer processors of the portable electrical power storage device exchange plan system, based on the received information regarding the user exchanging the portable electrical power storage device, whether to provide information regarding changing a portable electrical power storage device exchange plan of the user; and providing, by one or more computer processors of the portable electrical power storage device exchange plan system, information to a user regarding changing the portable electrical power storage device exchange plan of the user based on the determination of whether to provide information regarding changing the portable electrical power storage device exchange plan of the user.

The provided information regarding changing a portable electrical power storage device exchange plan may be information regarding changing a current portable electrical power storage device exchange plan of the user to a different portable electrical power storage device exchange plan. The current portable electrical power storage device exchange plan of the user may be a portable electrical power storage device exchange plan in which the user is allowed to have only one portable electrical power storage device for a vehicle at a time from one or more portable electrical power storage device collection, charging and distribution machines. The different portable electrical power storage device exchange plan of the user may be a portable electrical power storage device exchange plan in which the user is allowed to have multiple portable electrical power storage devices for a vehicle at a time from one or more portable electrical power storage device collection, charging and distribution machines. The information regarding a user exchanging a portable electrical power storage device of a vehicle may be information regarding one or more of: whether a vehicle of the user has one or more compartments configured to hold or use at least two portable electrical power storage devices at one time, and a number of vehicles associated with the user. The information regarding a user exchanging a portable electrical power storage device of a vehicle may be information regarding driving history of the user. The information regarding a user exchanging a portable electrical power storage device of a vehicle may be received from a remote portable electrical power storage device exchange plan information management system or one or more collection, charging and distribution machines. The information regarding a user exchanging a portable electrical power storage device of a vehicle may be received as a result of receiving input indicative of a user exchanging a portable electrical power storage device in possession of the user for a charged portable electrical power storage device. The providing information regarding changing the portable electrical power storage device exchange plan of the user may include providing the information regarding changing the portable electrical power storage device exchange plan of the user at a collection, charging and distribution machine. The providing information regarding changing the portable electrical power storage device exchange plan of the user may include providing the information regarding changing the portable electrical power storage device exchange plan of the user on a mobile device of the user.

A system for changing a portable electrical power storage device exchange plan may be summarized as including: at least one processor; and at least one memory coupled to the at least one processor, wherein the at least one processor is configured to: determine, based on a received information regarding a user exchanging a portable electrical power storage device at a collection, charging and distribution machine, whether to provide information via the collection, charging and distribution machine regarding changing a portable electrical power storage device exchange plan of the user; and providing information regarding changing the portable electrical power storage device exchange plan of the user via the collection, charging and distribution machine based on the determination of whether to provide information regarding changing a portable electrical power storage device exchange plan of the user.

The provided information regarding changing a portable electrical power storage device exchange plan may be information regarding changing a current portable electrical power storage device exchange plan of the user to a different portable electrical power storage device exchange plan. The current portable electrical power storage device exchange plan of the user may be a portable electrical power storage device exchange plan in which the user is allowed to have only one portable electrical power storage device for a vehicle at a time from one or more portable electrical power storage device collection, charging and distribution machines. The different portable electrical power storage device exchange plan may be a portable electrical power storage device exchange plan in which the user is allowed to have two portable electrical power storage devices for a vehicle at a time from one or more portable electrical power storage device collection, charging and distribution machines. The information regarding a user exchanging a portable electrical power storage device of a vehicle may be information regarding whether a vehicle of the user has one or more compartments configured for the vehicle to use at least two portable electrical power storage devices at one time or in tandem. The information regarding a user exchanging a portable electrical power storage device of a vehicle may include information regarding a promotion or incentive to offer the user to change a current portable electrical power storage device exchange plan of the user.

A non-transitory computer readable storage medium may be summarized as including computer executable instructions thereon that, when executed by one or more computer processors, cause the one or more computer processors to: authenticate a user; receive a request by a user to exchange a portable electrical power storage device of a vehicle; receive, based on the received request by the user to exchange the portable electrical power storage device, information regarding driving habits of the user; and determine, based on the received information regarding driving habits of the user, whether to provide information regarding changing a portable electrical power storage device exchange plan of the user.

The non-transitory computer readable medium wherein the instructions thereon, when executed by one or more computer processors, may further cause the one or more computer processors to provide information regarding changing the portable electrical power storage device exchange plan of the user based on the determination of whether to provide information regarding changing a portable electrical power storage device exchange plan of the user. The providing information regarding changing the portable electrical power storage device exchange plan of the user may include providing, at a collection, charging and distribution machine, the information regarding changing the portable electrical power storage device exchange plan of the user. The information regarding driving habits of the user may be information regarding portable electrical power storage device exchange history of the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
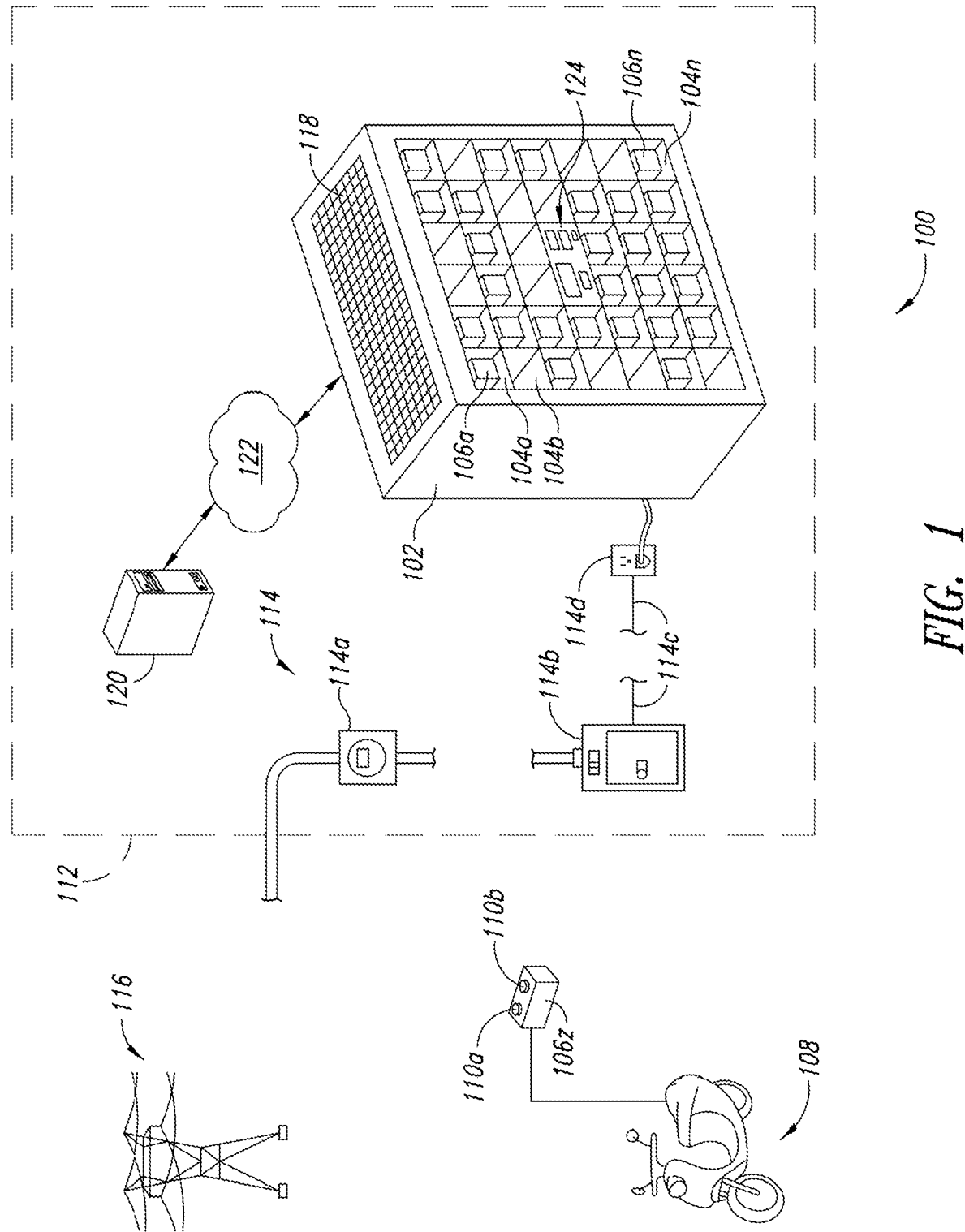
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment. It should be understood that while specific embodiments described herein refer to electrical power storage device collection, charging and distribution machines, such machines may carry out all three collection, charging and distribution functions, or a subset of these three functions.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example batteries (e.g., array of battery cells) or supercapacitors or ultracapacitors (e.g., array of ultracapacitor cells). For example, the portable electrical energy storage devices 106z may take the form of rechargeable batteries (i.e., secondary cells or batteries). The portable electrical energy storage devices 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106*z*) may include a number of electrical terminals 110*a*, 110*b* (two illustrated, collectively 110), accessible from an exterior of the portable electrical energy storage device 106*z*. The electrical terminals 110 allow charge to be delivered from the portable electrical energy storage device 106*z*, as well as allow charge to be delivered to the portable electrical energy storage device 106*z* for charging or recharging the same. While illustrated in FIG. 1 as posts, the electrical terminals 110 may take any other form which is accessible from an exterior of the portable electrical energy storage device 106*z*, including electrical terminals positioned within slots in a battery housing.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service shop. Alternatively, the collection, charging and distribution machine 102 may stand alone at a location 112 not associated with an existing retail or other business, for example in public parks or other public places.

Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort. Providing a system in which users who use the collection, charging and distribution machines (e.g., such as collection, charging and distribution machine 102) can be presented, on their mobile device, with information regarding their vehicle, the ability to change vehicle setting or configurations, and to receive alerts regarding maintenance of the vehicle and/or information regarding portable electrical energy storage devices or collection, charging and distribution machines, also enhances the ability to depend on such a system and likely commercial success of such an effort. The ability to present to users, on their mobile devices, with information regarding their vehicle, the ability to change vehicle setting or configurations, and to receive alerts regarding maintenance of the vehicle and/or information regarding portable electrical energy storage devices or collection, charging and distribution machines is addressed herein.

The location 112 may include an electrical service 114 to receive electrical power from a generating station (not shown) for example via a grid 116. The electrical service 114 may, for example, include one or more of an electrical service meter 114*a*, a circuit panel (e.g., circuit breaker panel or fuse box) 114*b*, wiring 114*c*, and electrical outlet 114*d*. Where the location 112 is an existing retail or convenience store, the electrical service 114 may be an existing electrical service, so may be somewhat limited in rating (e.g., 120 volts, 240 volts, 220 volts, 230 volts, 15 amps).

Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users. The ability to quickly charge while maintaining existing or otherwise limited rated electrical service is addressed in U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011.

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or pole mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machine 102 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
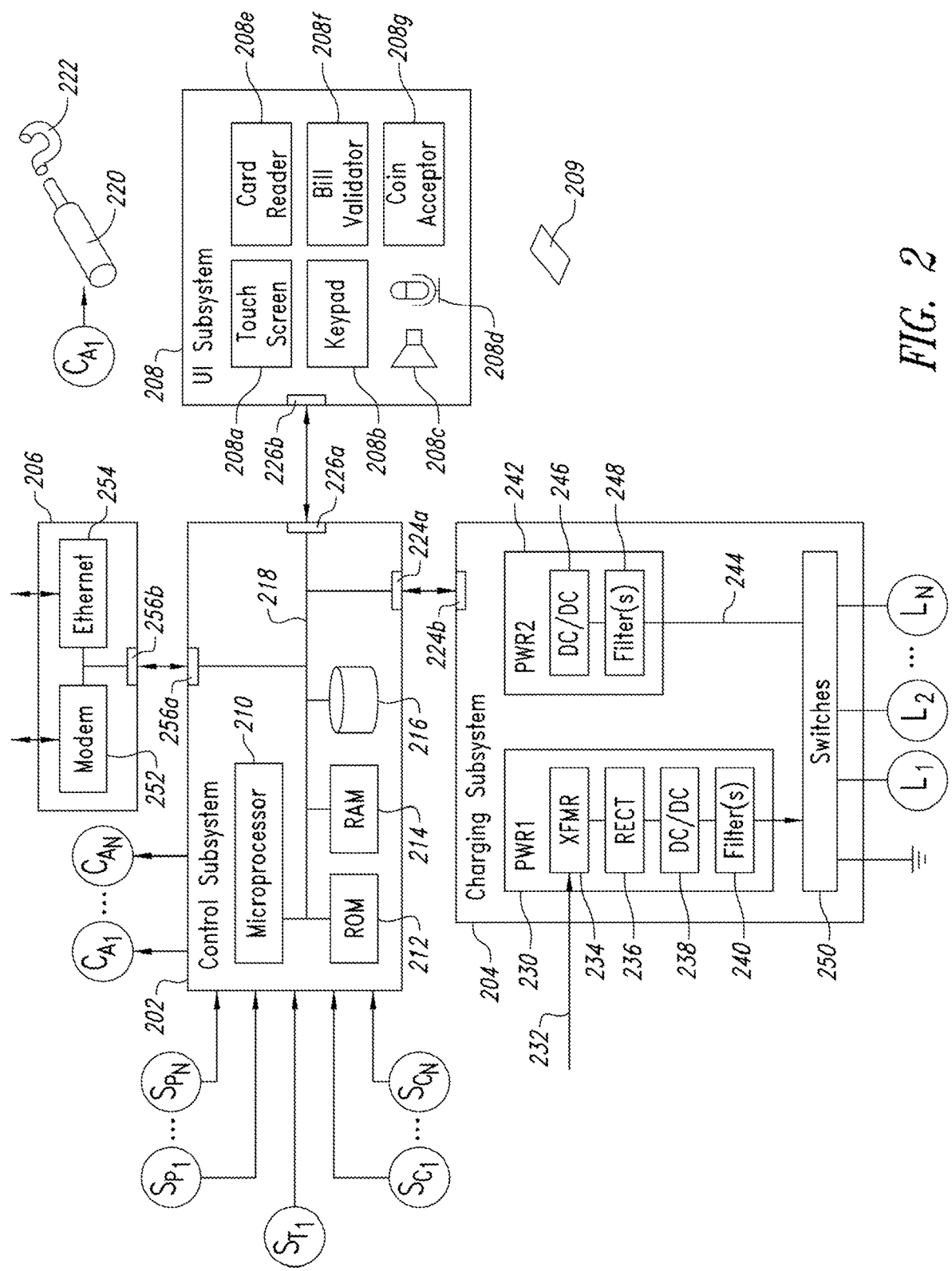
FIG. 2 is a block diagram of the collection, charging and distribution machine of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

Figure 7:
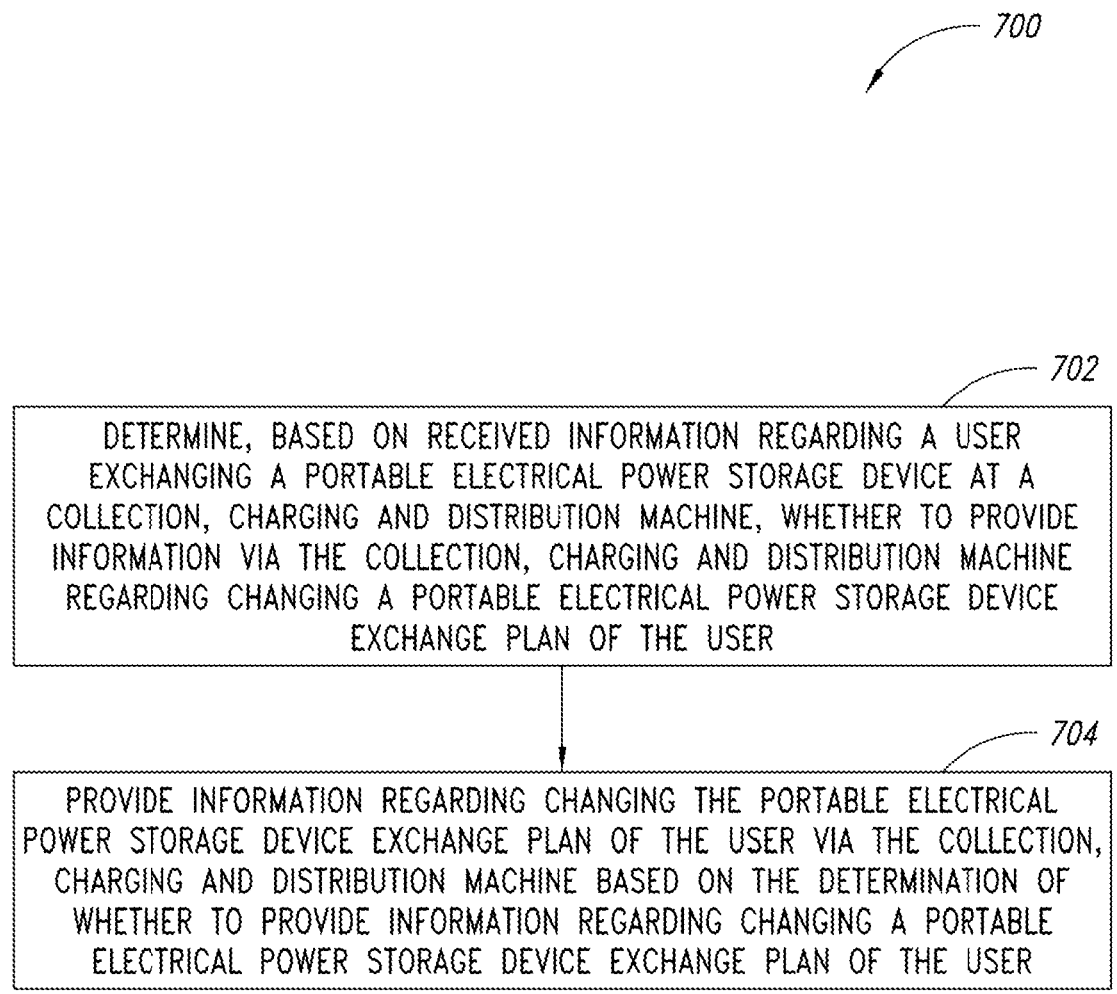
FIG. 7 is a flow diagram showing a method a system for changing a portable electrical power storage device exchange plan, according to a first alternative non-limiting illustrated embodiment.
Figure 8:
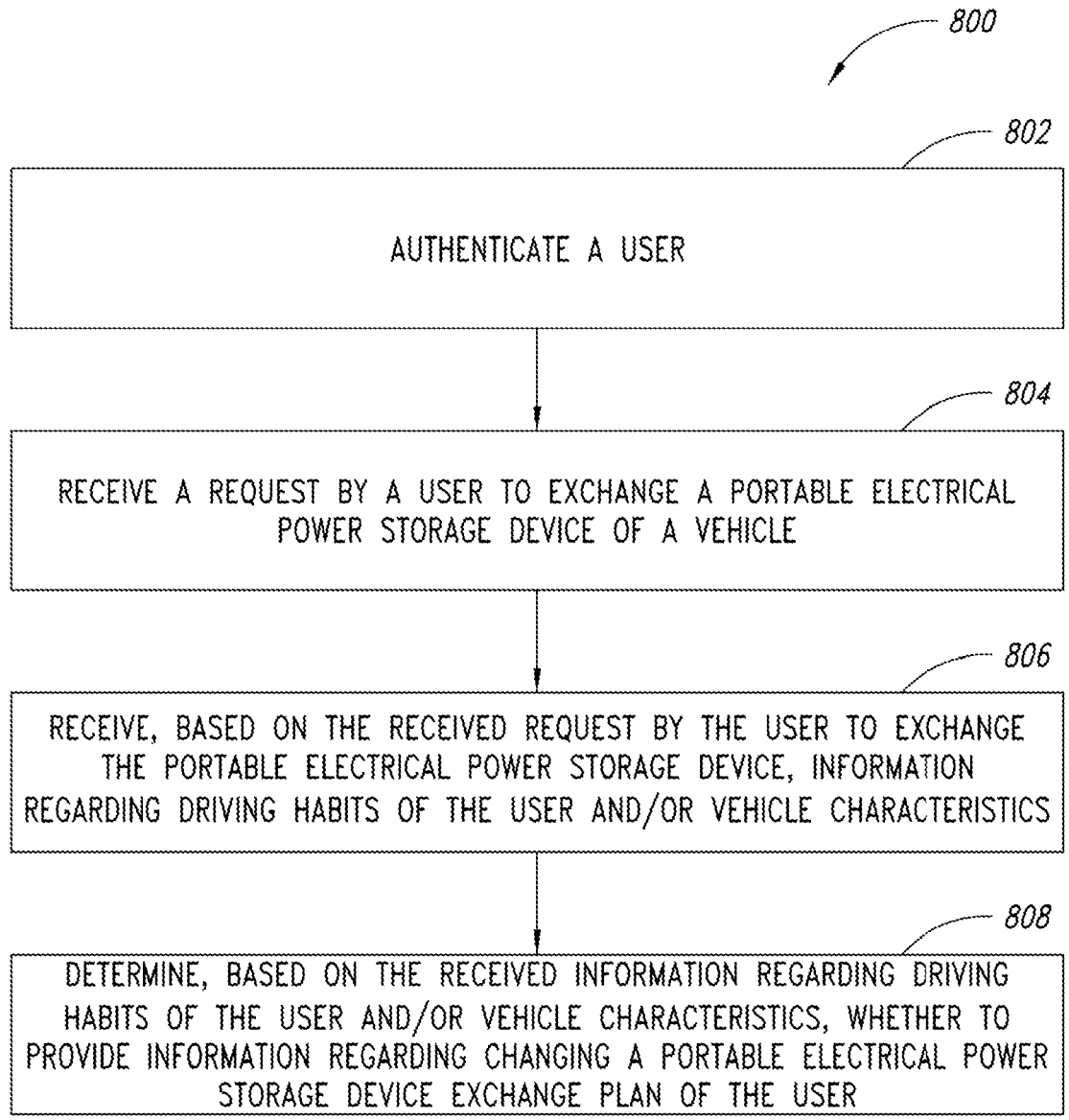
FIG. 8 is a flow diagram showing a method a system for changing a portable electrical power storage device exchange plan, according to a second alternative non-limiting illustrated embodiment.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 110. Execution of the instructions and sets of data or values causes the controller 110 to perform specific acts to cause the collection, charging and distribution machine 102 to collect, charge, and distribute portable energy storage devices. Specific operation of the collection, charging and distribution machine 102 is described herein and also below with reference to various flow diagrams (FIGS. 7-9).

The controller 210 may use RAM 214 in a conventional fashion, for volatile storage of instructions, data, etc. The controller 210 may use data store 216 to log or retain information, for example telemetric information related to collection, charging and/or distribution or collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence, the availability, or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 206. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 102 includes various electrical and electronic components to charge portable electrical power storage devices 106 when positioned or received in the receivers 104. For example, the charging subsystem 102 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 102 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example for rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may be any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 102 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 102 may include a dedicated power converter to convert or otherwise condition such electrical power.

The illustrated charging subsystem 102 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 102 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1$, $L_2$-$L_N$.

The communications subsystem 206 may additionally include one or more communications modules or components which facilitate communications with the various components of a back end or back office system 120 (FIG. 1). The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information from a variety of card media 209, for instance credit cards, debit cards, gift cards, prepaid cards, as well as identification media such as drivers licenses.

The user interface system 208 may include a bill acceptor 208f and a validator and/or coin acceptor 208g to accept and validate cash payments. Such may be highly useful in servicing populations who lack access to credit. Bill acceptor and validator 208f and/or coin acceptor 208g may take any variety of forms, for example those that are currently commercially available and used in various vending machines and kiosks.

Figure 3:
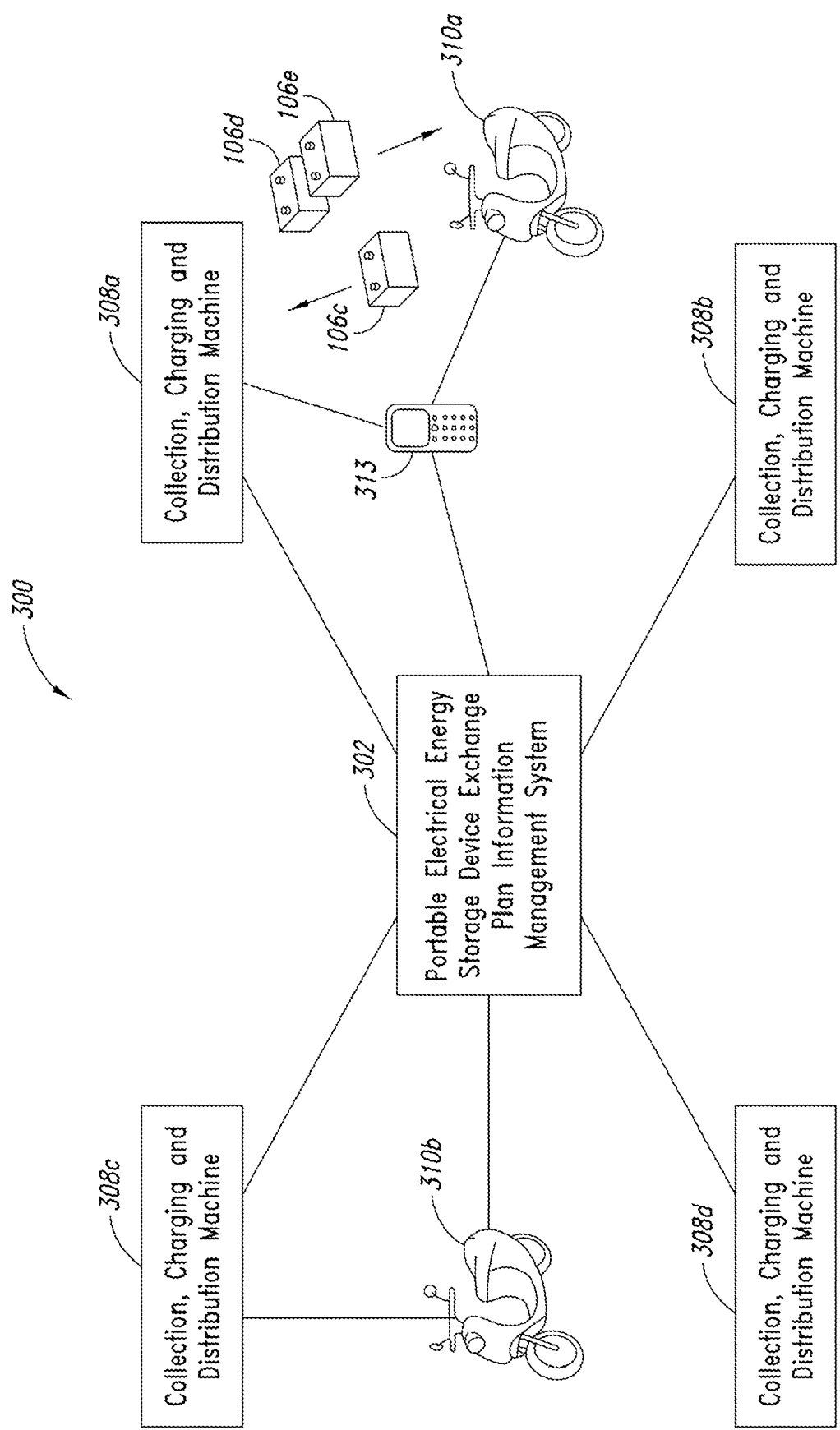
FIG. 3 is a block diagram of a system for changing a portable electrical power storage device exchange plan at a collection, charging and distribution machine, such as that of FIG. 1, according to one non-limiting illustrated embodiment.

FIG. 3 is a block diagram of a system 300 for changing portable electrical power storage device exchange plans which shows example collection, charging and distribution machines 308a, 308b, 308c and 308d, such as collection, charging and distribution machine 102 of FIG. 1, within the system, according to one non-limiting illustrated embodiment.

Shown is a portable electrical power storage device exchange plan information management system 302 for changing portable electrical power storage device exchange plans, such as, for example, at machines like the collection, charging and distribution machine 102 of FIG. 1. For example, the portable electrical power storage device exchange plan information management system 302 provides information regarding a current plan of the user during the process of the user exchanging a current portable electrical power storage device in possession of the user for a fully charged (or nearly fully charged) portable electrical power storage device at the collection, charging and distribution machine 308a.

For example, the user of vehicle 310a may currently be on a portable electrical power storage device exchange plan managed by the portable electrical power storage device exchange plan information management system 302 in which the user may only have one portable electrical power storage device from the system 300 at a time. The user may be authenticated at the collection, charging and distribution machine 308a by the collection, charging and distribution machine 308a or portable electrical power storage device exchange plan information management system 302. After authentication and during the process of the user exchanging their current portable electrical power storage device 106c at the collection, charging and distribution machine 308a, the portable electrical power storage device exchange plan information management system 302 may determine, based on information regarding the user, such as the ability of the user's vehicle 310a to carry and/or use at least two portable electrical power storage devices, to offer the user to upgrade to a two-portable electrical power storage device exchange plan such that the user may have two portable electrical power storage devices from the system 300 at a time.

In particular, in the example embodiment shown in FIG. 3, if the user selects to change their current portable electrical power storage device exchange plan to the two-portable electrical power storage device exchange plan at the collection, charging and distribution machine 308a, the user will return their current portable electrical power storage device 106c and will receive two portable electrical power storage devices (e.g., portable electrical power storage device 106d and portable electrical power storage device 106e) in exchange at the collection, charging and distribution machine 308a. The user may also be required to pay additional premiums, fees and/or commit to additional obligations while at the collection, charging and distribution machine 308a in order to change to the different portable electrical power storage device exchange plan. The offer may also be communicated via the user's mobile device 313 by the mobile device 313 receiving information from the collection, charging and distribution machine 308a, portable electrical power storage device exchange plan information management system 302 or vehicle 310a.

The information on which the collection, charging and distribution machine 308a and/or the portable electrical power storage device exchange plan information management system 302 base the determination of whether and which portable electrical power storage device exchange plan to offer the user may be based on a variety of different information, including, but not limited to, user driving habits, vehicle usage history, portable electrical power storage device exchange history (e.g., locations and number of exchanges), capabilities of the vehicle 310a, a user profile, user preferences, number of vehicles owned by the user, etc. This information may be received from a variety of sources including one or more of, but not limited to: the vehicle 310a; a memory module attached to a portable electrical power storage device being exchanged by the user (e.g., portable electrical power storage device 106c), the memory module storing such information and which had the information communicated to it by a system of the vehicle 310a; the mobile device 313, etc. The portable electrical power storage device exchange plan may be for any number and/or types of portable electrical power storage devices, depending on the determination by the system 302 described above and the capabilities of the vehicle 310a.

The information on which the collection, charging and distribution machine 308a and/or the portable electrical power storage device exchange plan information management system 302 bases the determination of whether and which portable electrical power storage device exchange plan(s) to offer the user may be communicated to, stored in and communicated from a memory module attached to the portable electrical energy storage device of vehicle 310a as described in U.S. Provisional Patent Application Ser. No. 61/601,404 entitled "APPARATUS, METHOD AND ARTICLE FOR PROVIDING VEHICLE DIAGNOSTIC DATA" and filed on Feb. 21, 2012, and/or described in U.S. patent application Ser. No. 13/559,390 also entitled "APPARATUS, METHOD AND ARTICLE FOR PROVIDING VEHICLE DIAGNOSTIC DATA" and filed on Jul. 26, 2012, both of which are hereby incorporated by reference in their entireties. In some embodiments, the portable electrical power storage device exchange plan information management system 302 may be the back end or back office system 120 shown in FIG. 1. Also, such information may include information received from a memory module attached to the portable electrical energy storage device of the electric scooter 310a or 310b. This also may include information received from a memory module attached to or associated with the vehicle 310a or 310b, (e.g., a memory module of a subsystem or control system of vehicle 310a or 310b that stores or is configured to store diagnostic, status, settings, control information, historical driving habits or routes regarding the vehicle or other vehicles associated with a user, an account and/or a profile of a user, etc). Additionally, the information on which the collection, charging and distribution machine 308a and/or the portable electrical power storage device exchange plan information management system 302 bases the determination of whether and which portable electrical power storage device exchange plan(s) to offer the user may be communicated to, stored in and communicated from any memory module storing or configured to store at least some of such information. In other embodiments, the portable electrical power storage device exchange plan information management system 302 may be part of or may in operable communication with, the back end or back office system 120 shown in FIG. 1.

In some embodiments, the information on which the collection, charging and distribution machine 308a and/or the portable electrical power storage device exchange plan information management system 302 base the determination of whether and which portable electrical power storage device exchange plan(s) to offer the user may include information regarding usage history of the vehicle. For example, this information may include, but is not limited to the current location of the vehicle 310a and/or mobile device 313, portable electrical power storage device exchange history of the user, the roads and driving routes previously taken to particular collection, charging and distribution machines from the current location of the vehicle 310a and/or mobile device 313, preferred routes of the user, historical driving routes of the user, the current direction the user is traveling, historical driving routes of the user determined based on portable electrical energy storage device exchanges which occurred at various collection, charging and distribution machines (e.g., collection, charging and distribution machines 308a, 308b, 308c and 308d), etc.

The portable electrical power storage device exchange plan information management system 302 is in operable communication with the collection, charging and distribution machines 308a, 308b, 308c and 308d, the vehicle 310a, and one or more user mobile communication devices 313 (only one shown as an example), such that data may be exchanged between the portable electrical power storage device exchange plan information management system 302, the collection, charging and distribution machines 308a, 308b, 308c and 308d, the vehicle 310a, and the user mobile communication device 313. In some embodiments, such exchange of data may be accomplished via storage of such data on a memory module attached to a portable electrical energy storage device used by the vehicle which is exchanged at one or more of collection, charging and distribution machines 308a, 308b, 308c and 308d. Also, the portable electrical power storage device exchange plan information management system 302, the collection, charging and distribution machines 308a, 308b, 308c and 308d, and the user mobile communication device 313 may, in some embodiments, additionally or instead be in operable communication directly with each other.

This communication between the various items, systems and entities of FIG. 3 is enabled by the various communications subsystems of these various items, systems and entities. For example, this communication may be enabled by the various communications subsystems of the distribution machines 308a, 308b, 308c and 308d, the portable electrical power storage device exchange plan information management system 302, the vehicles 310a and 310b, and the user mobile communications device 313. One or more of such communication subsystems may provide wired and/or wireless communications (e.g., cellular, local area network connections, and/or short range wireless connections using or being compatible with any operable communications protocol and/or standard). The communications subsystems of the items in FIG. 3 may include one or more ports, wireless receivers, wireless transmitters or wireless transceivers to provide wireless signal paths to the various remote components or systems. The remote communications subsystems may include one or more bridges or routers suitable to handle network traffic including switched packet type communications protocols (TCP/IP), Ethernet or other networking protocols.

For example, the portable electrical power storage device exchange plan information management system 302 may receive an update from collection, charging and distribution machine 308a regarding the current portable electrical power storage device exchange plan of the user and/or usage history of the vehicle. In some embodiments, the portable electrical power storage device exchange plan information management system 302 may continually or periodically monitor the collection, charging and distribution machines or other items shown in FIG. 3 to obtain such information. Also, the collection, charging and distribution machines may continually or periodically provide updates to the portable electrical power storage device exchange plan information management system 302 regarding the portable electrical power storage device exchange plans. This information may be provided to mobile device 313, vehicle 310a, and/or vehicle 310b continuously, periodically, aperiodically and/or or in response to a request for such information from mobile device 313, vehicle 310a, and/or vehicle 310b. For example, the portable electrical power storage device exchange plan system information regarding the user may be provided to mobile device 313, vehicle 310a, and/or the portable electrical power storage device exchange plan information management system 302 in response to the mobile device 313 and/or vehicle 310a being detected by the collection, charging and distribution machine 308a as being within close proximity to collection, charging and distribution machine 308a.

An alert may be sent to the mobile device 313 or vehicle 310a (e.g., via a text message, email, instant message, status update on a social media network, automated phone call, as a notification within a specific application, etc.) regarding diagnostics or status of the vehicle (e.g., portable electrical energy storage device charge level, maintenance warnings, offers, promotions) etc., based on the exchange plan information. This alert may be sent via any variety of communications channels including, but not limited to, cellular telephone networks, computer wireless fidelity (Wi-Fi) networks, satellite networks, short range wireless signals, etc., or any operable combination thereof.

The alert may also include a selectable link, icon or other user interface element that the user may select to reserve the available portable electrical energy storage device associated with the a current or an offered upgraded portable electrical power storage device exchange plan. For example, once the element is selected, information representing the reservation is communicated to the portable electrical power storage device exchange plan information management system 302 and/or the respective collection, charging and distribution machine at which the portable electrical energy storage device is available. If the upgraded plan is selected, the portable electrical power storage device exchange plan information management system 302 records the upgrade in a database associating exchange plans with users and/or vehicles, and this reservation information is stored in a database of reservations maintained centrally by the portable electrical power storage device exchange plan information management system 302 and/or locally at the selected collection, charging and distribution machine.

Any item of FIG. 3 may identify, authenticate, verify or otherwise facilitate such operations via the user interface of the vehicle 310a, the mobile device 313, and/or or collection, charging and distribution machine 308a by the user inputting particular user credentials, a password, biometric data, the user identification number or code, and/or by the card reader 208e described above, etc. Also, any item of FIG. 3 may additionally or alternatively identify, authenticate, verify or otherwise facilitate such operations via information received from a user security token (not shown), mobile device 313 or other item associated with the user. Also, the information regarding the portable electrical power storage device exchange plans and offers to change plans may be communicated and organized in any manner including in a list, as a group of selectable icons, etc., that indicates and/or represents this information. Also, users may be provided an incentive (e.g., a discounted fee, free device exchanges, etc.) to change their current portable electrical power storage device exchange plan via the mobile device 313 and/or at the collection, charging and distribution machine.

Figure 4:
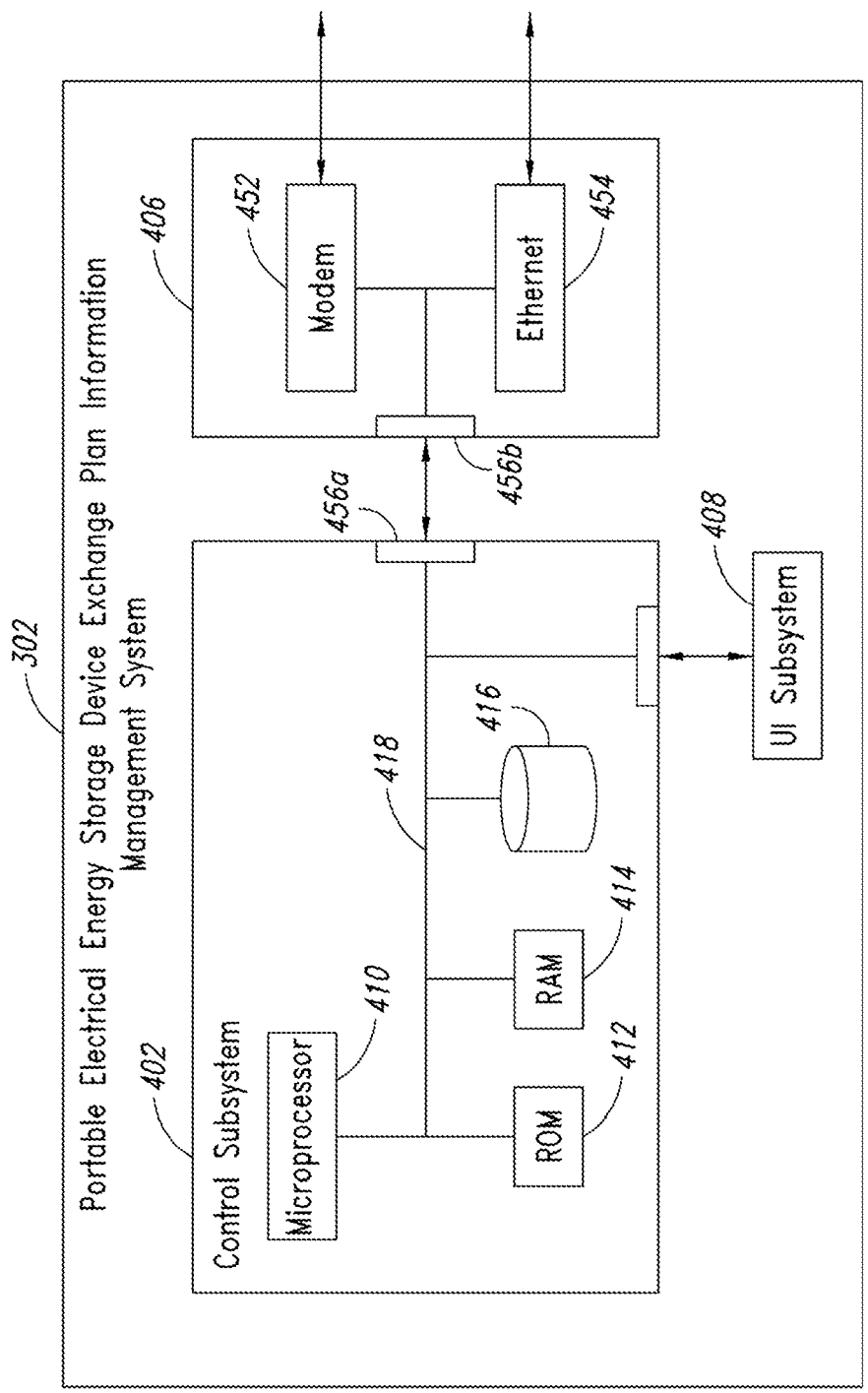
FIG. 4 is a schematic view of the portable electrical power storage device exchange plan information management system of FIG. 3, according to one non-limiting illustrated embodiment.

FIG. 4 is a schematic view of the portable electrical power storage device exchange plan information management system 302 of FIG. 3, according to one non-limiting illustrated embodiment.

The portable electrical power storage device exchange plan information management system 302 includes a control subsystem 402, a communications subsystem 406, and a user interface subsystem 408. However, such a system and associated functionalities, or operable sub-components thereof, may also be present in the vehicle (e.g., vehicle 310a of FIG. 3), the memory module attached to the portable electrical energy storage device, the collection, charging and distribution machine 308a and/or the user mobile device 313, also shown in FIG. 3.

The control subsystem 402 includes a controller 410, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The control subsystem 402 may also include one or more non-transitory processor- or computer-readable storage media, for example read only memory (ROM) 412, random access memory (RAM) 414, and data store 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The control subsystem 402 may include one or more buses 418 (only one illustrated) coupling various components together, for example one or more power buses, instruction buses, data buses, etc.

Figure 6:
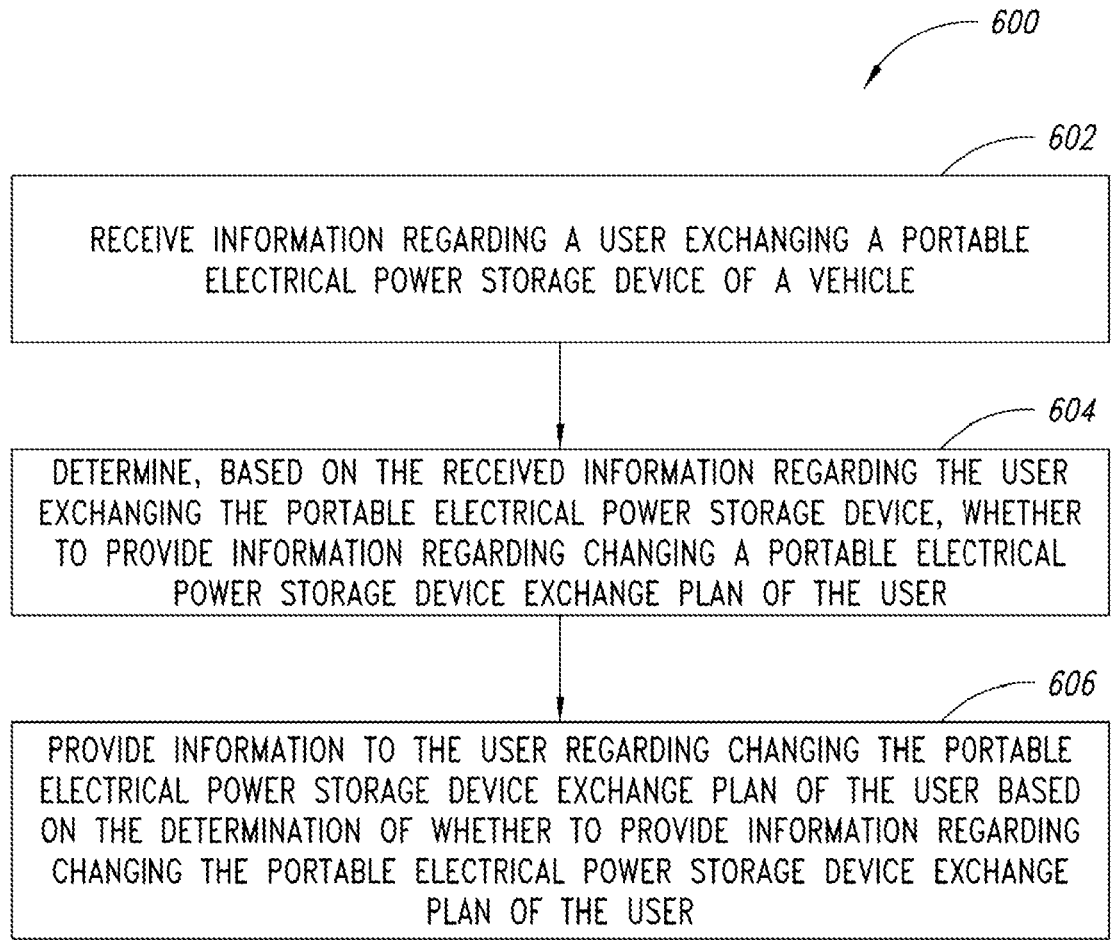
FIG. 6 is a flow diagram showing a method a system for changing a portable electrical power storage device exchange plan, according to a non-limiting illustrated embodiment.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to cause the portable electrical power storage device exchange plan information management system 302 to receive, send and/or to provide information regarding a vehicle, a user and/or portable electrical power storage device exchange plan information to various external devices (e.g., such as those items shown in FIG. 4, or devices associated with those items). Execution of the instructions and sets of data or values may also cause the controller 410 to perform specific acts to cause the portable electrical power storage device exchange plan information management system 302 receive, send, store, maintain, update and otherwise manage information regarding a vehicle, users, and/or portable electrical power storage device exchange plan information associated with particular users. Specific operation of the portable electrical power storage device exchange plan information management system 302 is described herein and also below with reference to various flow diagrams (FIGS. 6-8).

The controller 410 may use RAM 414 in a conventional fashion, for volatile storage of instructions, data, etc. The controller 410 may use data store 416 to log or retain information, for example, information regarding one or more of: a vehicle, users, portable electrical power storage device exchange plan information associated with particular users, portable electrical power storage device exchange history of one or more users, current portable electrical power storage device inventory, offers and/or incentives to users for changing exchange plans, status or condition of the vehicle, status or condition of one or more systems of the vehicle, customizable features of the vehicle, settings of customizable features of the vehicle, condition or status of an engine or motor of the vehicle, one or more electrical systems of the vehicle, health of the vehicle, security of the vehicle, locks of the vehicle, transmission system of the vehicle, maintenance of the vehicle, recommended maintenance of the vehicle, scheduled maintenance of the vehicle, brake pad condition of the vehicle, status of one or more vehicle lights, engine temperature of the vehicle, mileage of the vehicle, one or more wheels of the vehicle, one or more tires of the vehicle, tire wear of one or more tires of the vehicle, tire pressure of one or more tires of the vehicle, speed of the vehicle, statistics regarding different speeds of the vehicle over time, one or more fluid levels of the vehicle (e.g., oil level), condition or status of an electrical energy storage device of the vehicle, a dashboard of the vehicle, a dashboard display of the vehicle, a current state of a dashboard display of the vehicle, configurable settings of a customizable dashboard display of the vehicle, information stored on a computer readable medium coupled to a portable electrical energy storage device of the vehicle, configurable vehicle lighting, configurable vehicle lighting status, configurable vehicle lighting settings, current odometer reading of the vehicle, historical usage statistics of the vehicle, historical usage statistics regarding a electrical energy storage device of the vehicle, historical usage statistics regarding a motor of the vehicle, historical usage statistics regarding efficiency of the vehicle, geographic travel statistics of the vehicle, a current location of the vehicle, previous locations of the vehicle, target efficiency of the vehicle, recommended settings of the vehicle, user account settings of a user associated with the vehicle, portable electrical energy storage devices for the vehicle, available portable electrical energy storage devices for the vehicle, locations of one or more available portable electrical energy storage devices for the vehicle, one or more collection, charging and distribution machines for portable electrical energy storage devices for the vehicle, portable electrical energy storage device exchange history at one or more collection, charging and distribution machines for portable electrical energy storage devices for the vehicle, and locations of one or more collection, charging and distribution machines for portable electrical energy storage devices for the vehicle.

The control subsystem 402 may also receive signals from various sensors and/or components of a collection, charging and distribution machine, such as the collection, charging and distribution machine 102 of FIG. 1 via the communications subsystem 206 of collection, charging and distribution machine 102. This information may include information that characterizes or is indicative of operation, status, or condition of such components. Sensors are represented in FIG. 2 by the letter S appearing in a circle along with appropriate subscript letters. For example, one or more position sensors $S_{P1}$-$S_{PN}$ may detect the presence or absence of portable electrical power storage device 106 at each of the receivers 104. This information may be communicated to the control subsystem 402. Also, one or more charge sensors $S_{C1}$-$S_{CN}$ may detect a charge level charge of the portable electrical power storage devices 106 at each of the receivers 104. This information may also be communicated to the control subsystem 402.

The communications subsystem 406 may include one or more communications modules or components which facilities communications with the various components of a collection, charging and distribution machine, such as collection, charging and distribution machine 112 of FIG. 1 and also the various components of the collection, charging and distribution machines 308a, 308b, 308c and 308d of FIG. 3, and the one or more user mobile communication devices 313, such that data may be exchanged between the portable electrical power storage device exchange plan information management system 302, the collection, charging and distribution machines 308a, 308b, 308c and 308d, and the user mobile communication device 313. The communications subsystem 406 may, for example, include one or more modems 452 or one or more Ethernet or other types of communications cards or components 454. A port 456a of the control subsystem 402 may communicatively couple the control subsystem 402 with a port 456b of the communications subsystem 406.

The communications subsystem 406 may provide wired and/or wireless communications. The communications subsystem 406 may include one or more ports, wireless receivers, wireless transmitters or wireless transceivers to provide wireless signal paths to the various remote components or systems employing or making use of any operable wired and wireless communications standard or protocol. The remote communications subsystem 406 may include one or more bridges or routers suitable to handle network traffic including switched packet type communications protocols (TCP/IP), Ethernet or other networking protocols.

The user interface system 408 includes one or more user input/output (I/O) components (not illustrated). For example, user interface system 408 may include a touch screen display operable to present information and a graphical user interface (GUI) to a user and to receive indications of user selections. The user interface system 408 may include a keyboard or keypad, and/or a cursor controller (e.g., mouse, trackball, trackpad, and/or touch screen) to allow a user to enter information and/or select user selectable icons in a GUI.

Figure 5A:
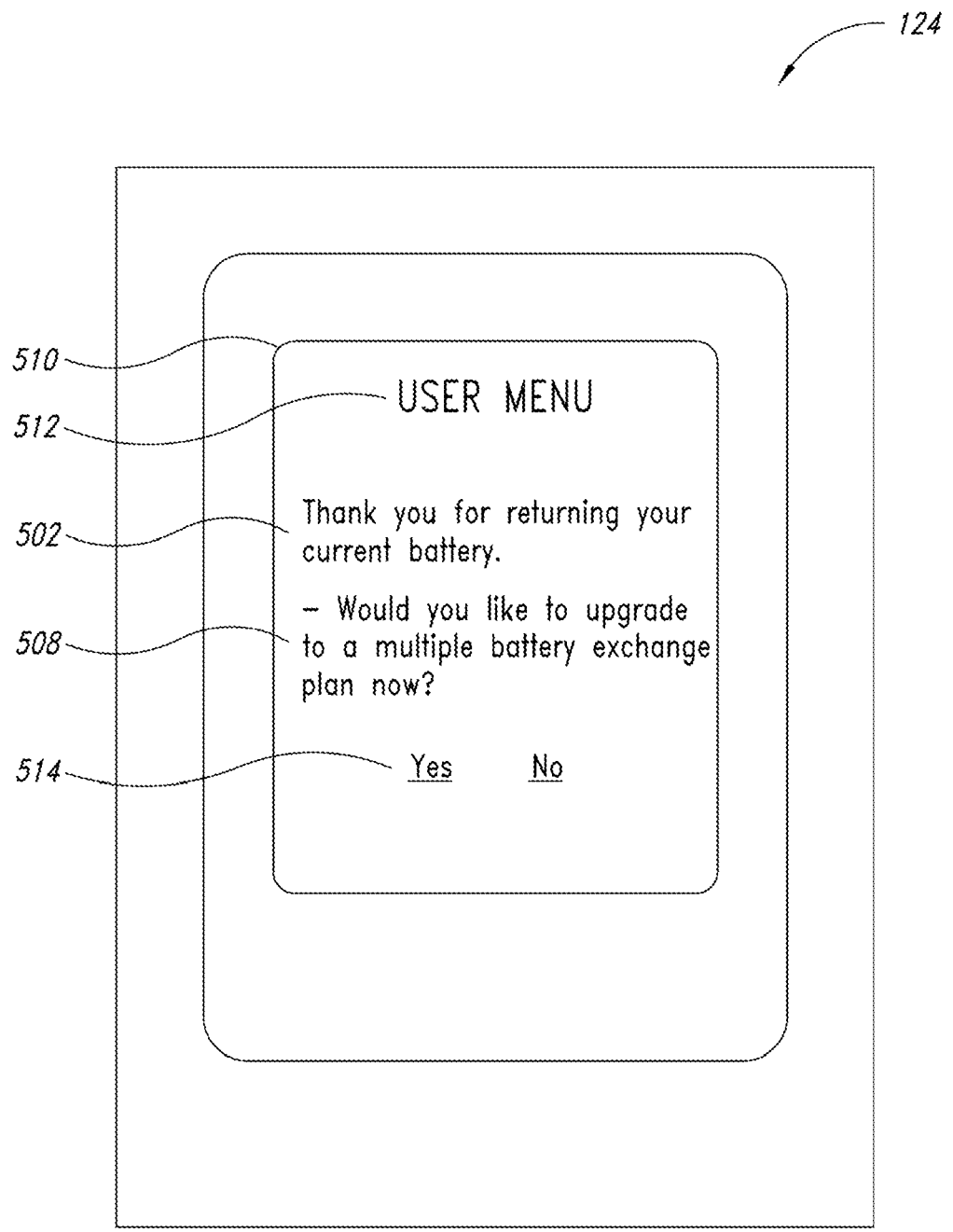
FIG. 5A is an example user interface presenting information to a user regarding changing the portable electrical power storage device exchange plan of the user, according to one non-limiting illustrated embodiment.

FIG. 5A is an example user interface 124 of a collection, charging and distribution machine (e.g., such as collection, charging and distribution machine 308a in FIG. 3) presenting information during a process of a user exchanging a current portable electrical power storage device at a collection, charging and distribution machine 308a, providing the user the opportunity to upgrade to a multiple portable electrical power storage device exchange plan to receive multiple portable electrical power storage devices in exchange for their current single portable electrical power storage device. Once upgraded to the multiple portable electrical power storage device exchange plan, the user may be allowed to have multiple (e.g. two) portable electrical power storage devices provided by the system 302 (e.g., via a collection, charging and distribution machine) at a time. For example, this may be useful when the user has a vehicle which can carry and/or use multiple portable electrical power storage devices at a time in order to increase performance and/or portable electrical power storage device available charge before having to exchange their depleted portable electrical power storage device(s) for one or more fully charged portable electrical power storage devices.

The portable electrical power storage device exchange plan upgrade may be an upgrade to any plan that includes an increase in the number of portable electrical power storage devices the user may have at one time under the plan. For example, this may be from one to multiple portable electrical power storage devices (e.g., one to two, one to three, one to five, two to three, two to four, four to five, etc.) Also, in some embodiments, instead of an upgrade it may be a downgrade in the number of portable electrical power storage devices the user may have at one time under the plan, which may be useful when a user's vehicle or number of vehicles changes such that a reduced number of portable electrical power storage devices are desired at one time.

In particular, in one embodiment, shown on the user interface 124 is a display area 502 (e.g., a touch screen display) on which a user menu 512 is provided after the user has provided their current portable electrical power storage device to the collection, charging and distribution machine to receive a substantially fully charged portable electrical power storage device. Before providing the fully charged portable electrical power storage device, the collection, charging and distribution machine 308a presents a prompt 508 asking the user if the user would like to upgrade to a multiple portable electrical power storage device exchange plan while at the collection, charging and distribution machine 308a. The user may select a user interface element (e.g., the "Yes" link or button 514) to indicate the user desires to upgrade to the multiple portable electrical power storage device exchange plan.

The user may be prompted in order to suggest an upgrade or otherwise change their portable electrical power storage device exchange plan based on a variety of different information, including, but not limited to one or more of: user driving habits, vehicle usage history, portable electrical power storage device exchange history (e.g., locations and number of exchanges), capabilities of the vehicle 310a, a user profile, user preferences, number of vehicles owned by the user, etc. This information may be received from a variety of sources including one or more of, but not limited to: the vehicle 310a; a memory module attached to a portable electrical power storage device being exchanged by the user (e.g., portable electrical power storage device 106c), the memory module storing such information and which had the information communicated to it by a system of the vehicle 310a; the mobile device 313, etc. The portable electrical power storage device exchange plan may be for any number and/or types of portable electrical power storage devices, depending on the determination by the system 302 described above and the capabilities of the vehicle 310a. The portable electrical power storage device exchange plan to which the user may change and/or the user's current plan may include, be dependent on, and/or be associated with various features and/or components including, but not limited to: incentives, trial periods, offers, promotions, referral incentives, credits, coupons, freebies, etc., some or all of which may be time sensitive. For example, in some embodiments, the user may be prompted or otherwise notified of that they may benefit from an upgraded portable electrical power storage device exchange plan.

The user may be offered a trial period for the plan (e.g., a seven day trial period) and after which the system for changing a portable electrical power storage device exchange plan may automatically or otherwise start charging the user for the upgraded plan. If the user decides they don't like the upgraded plan, or for whatever reason wants to cancel their participation in the upgraded plan before the free trial period ends, the user may do so in any variety of ways. For example the user may cancel the upgraded plan before the free trial period ends by putting one or more portable electrical power storage devices back into the portable electrical power storage device collection and distribution machine. The user will then be prompted (e.g., on the interface of the collection and distribution machine, on the user's mobile device, on a vehicle interface, etc.) to elect whether to continue the upgraded plan trial and revert back to their previous plan (e.g., to the single portable electrical power storage device exchange plan or other different plan).

Figure 5B:
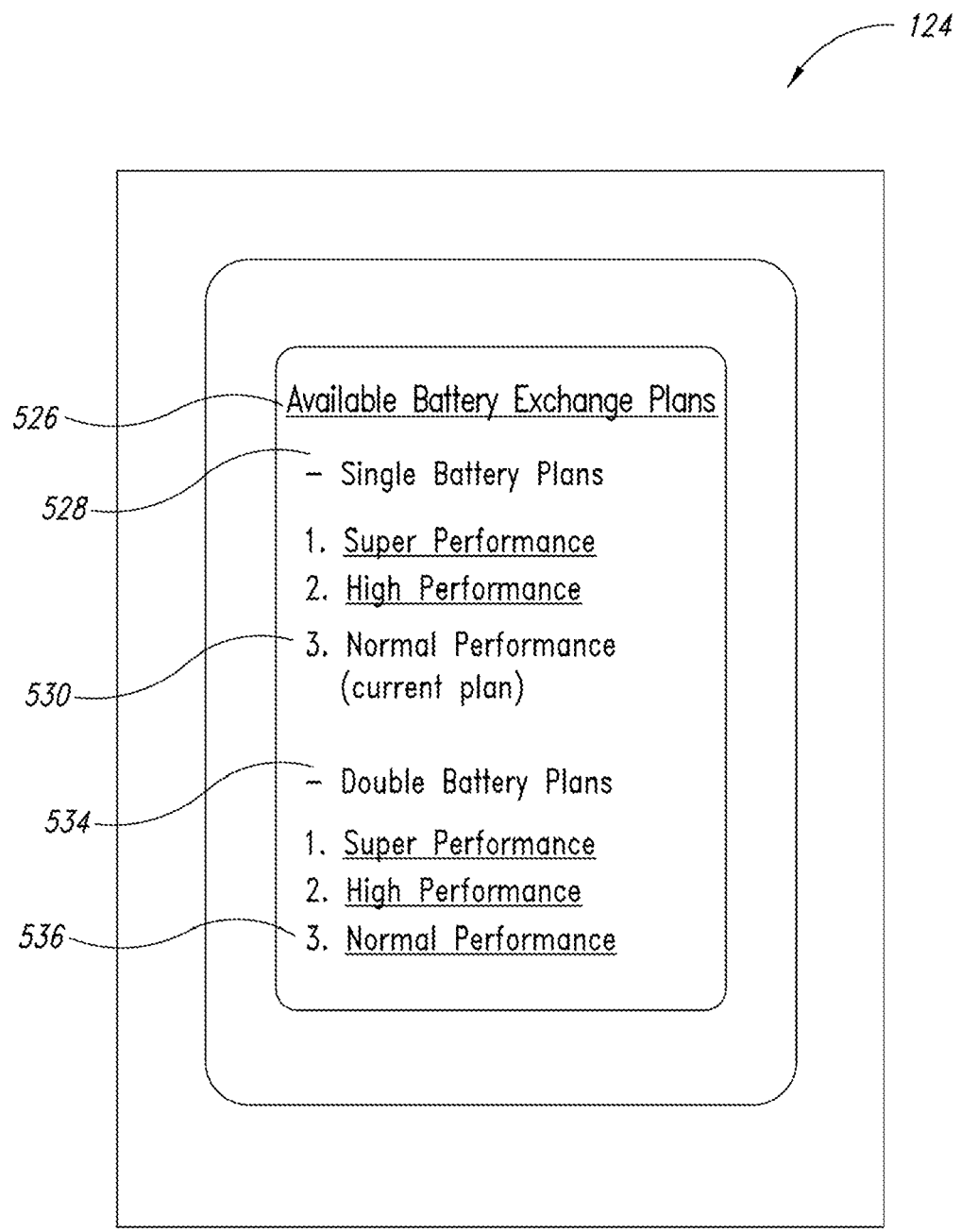
FIG. 5B is an example user interface presenting information to a user regarding available portable electrical power storage device exchange plans, according to one non-limiting illustrated embodiment.

FIG. 5B is an example user interface 124 presenting information to a user regarding available portable electrical power storage device exchange plans, according to one non-limiting illustrated embodiment. The user interface 124 described herein in FIG. 5A and FIG. 5B may also be that of a user mobile device 313.

For example, if the user selects the "Yes" button or link 514 as shown in FIG. 5A, then the available portable electrical power storage device exchange plans 526 are presented to the user from which to select. For example, the user may select the "normal performance" plan 536 under the "double battery plans" 534 by selecting such items on the menu via the user interface 124. The user will then be switched to this plan via the collection, charging and distribution machine 308a communicating this selection to the portable electrical power storage device exchange plan information management system 302.

FIG. 6 is a flow diagram showing a method 600 in a system for changing a portable electrical power storage device exchange plan, according to a non-limiting illustrated embodiment.

At 602, a collection, charging and distribution machine receives information regarding a user exchanging a portable electrical power storage device of a vehicle.

At 604, the collection, charging and distribution machine determines, based on the received information regarding the user exchanging the portable electrical power storage device, whether to provide information regarding changing a portable electrical power storage device exchange plan of the user.

At 606, the collection, charging and distribution machine, provides information to the user regarding changing the portable electrical power storage device exchange plan of the user based on the determination of whether to provide information regarding changing the portable electrical power storage device exchange plan of the user.

FIG. 7 is a flow diagram showing a method 700 in a system for changing a portable electrical power storage device exchange plan, according to a first alternative non-limiting illustrated embodiment.

At 702, the portable electrical power storage device exchange plan information management system determines, based on received information regarding a user exchanging a portable electrical power storage device at a collection, charging and distribution machine, whether to provide information via the collection, charging and distribution machine regarding changing a portable electrical power storage device exchange plan of the user.

At 704, the portable electrical power storage device exchange plan information management system provides information regarding changing the portable electrical power storage device exchange plan of the user via the collection, charging and distribution machine based on the determination of whether to provide information regarding changing a portable electrical power storage device exchange plan of the user.

FIG. 8 is a flow diagram showing a method 800 in a system for changing a portable electrical power storage device exchange plan, according to a second alternative non-limiting illustrated embodiment At 802, the portable electrical power storage device exchange plan information management system authenticates the user.

At 804, the portable electrical power storage device exchange plan information management system receives a request by a user to exchange a portable electrical power storage device of a vehicle.

At 806, the portable electrical power storage device exchange plan information management system receives, based on the received request by the user to exchange the portable electrical power storage device, information regarding driving habits of the user and/or vehicle characteristics. For example, this information regarding driving habits of the user may be (or may be based on or derived from) portable electrical power storage device exchange history received from various portable electrical power storage device collection, charging and distribution machines and then stored by the power storage device exchange plan information management system.

At 808, the portable electrical power storage device exchange plan information management system determines, based on the received information regarding driving habits of the user and/or vehicle characteristics, whether to provide information regarding changing a portable electrical power storage device exchange plan of the user.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012; U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. provisional patent application Ser. No. 61/511,887, entitled "THERMAL MANAGEMENT OF COMPONENTS IN ELECTRIC MOTOR DRIVE VEHICLES" and filed Jul. 26, 2011 and U.S. provisional patent application Ser. No. 61/511,880, entitled "DYNAMICALLY LIMITING VEHICLE OPERATION FOR BEST EFFORT ECONOMY" and filed Jul. 26, 2011; are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method performed by a processor in a battery exchange system, the method comprising:
   detecting, by the processor, receipt of an at least partially depleted battery;
   receiving, by the processor from a memory attached to the received battery, information indicating a characteristic of at least two battery compartments of a vehicle, wherein the at least two battery compartments are configured to hold at least two batteries, wherein the characteristic of the at least two battery compartments indicates how the at least two batteries are used to power the vehicle; and
   determining, by the processor, the at least two batteries for powering the vehicle based on the characteristic of the at least two battery compartments.

2. The method of claim 1, further comprising determining whether to provide information regarding the amount of energy to be consumed by the vehicle to a user, wherein the received information includes a number of vehicles associated with a user profile associated with the at least partially depleted battery, and wherein the method comprises determining the amount of energy to be consumed by the vehicle based on the number of vehicles associated with the user profile associated with the at least partially depleted battery.

3. The method of claim 2 wherein the user is allowed to have only one battery for the vehicle at a time from one or more battery collection and distribution machines.

4. The method of claim 2 wherein the user is allowed to have multiple batteries for the vehicle at a time from one or more battery collection and distribution machines.

5. The method of claim 1 wherein the received information is received in response to an input indicative of a user exchanging a battery in possession of the user for a charged battery.

6. A battery exchange system comprising:
   at least one processor configured to:
      detect receipt of an at least partially depleted battery;
      receive, from a memory attached to the received battery, information indicating a characteristic of at least two battery compartments of a vehicle, wherein the least two battery compartments are configured to hold at least two batteries, wherein the characteristic of the at least two battery compartments indicates how the at least two batteries are used to power the vehicle; and
      determine the at least two batteries for powering the vehicle based on the received information characteristic of the at least two battery compartments.

7. The system of claim 6 wherein the at least one processor is further configured to provide information the amount of energy to be consumed by the vehicle to a user, and wherein the received information includes a number of vehicles associated with a user profile associated with the at least partially depleted battery, and wherein the method comprises determining the amount of energy to be consumed by the vehicle based on the number of vehicles associated with the user profile associated with the at least partially depleted battery.

8. The system of claim 7 wherein the user is allowed to have only one battery for the vehicle at a time from one or more battery collection and distribution machines.

9. The system of claim 8 wherein the user is allowed to have two batteries for the vehicle at a time.

10. A non-transitory computer readable storage medium having computer executable instructions thereon that, when executed by one or more computer processors, cause the one or more computer processors to:
  detect receipt of an at least partially depleted battery;
  receive a request to exchange a battery of a vehicle;
  receive, based on the received request to exchange the battery from a memory attached to the received battery, information indicating a characteristic of at least two battery compartments of the vehicle, wherein the two battery compartments are configured to hold at least two batteries, wherein the characteristic of the at least two battery compartments indicates how the at least two batteries are used to power the vehicle; and
  determine the at least two batteries for powering the vehicle based on the characteristic of the at least two or more battery compartments.

11. The non-transitory computer readable medium of claim 10 wherein the instructions thereon, when executed by one or more computer processors, further cause the one or more computer processors to:
  provide information regarding the amount of energy to be consumed by the vehicle to a user, wherein the information regarding the amount of energy to be consumed by the vehicle includes a number of battery or batteries to be exchanged at one time;
  wherein the received information includes a number of vehicles associated with a user profile associated with the at least partially depleted battery, and wherein the method comprises determining the amount of energy to be consumed by the vehicle based on the number of vehicles associated with the user profile associated with the at least partially depleted battery.

12. The non-transitory computer readable medium of claim 10 wherein the received information includes information regarding battery exchange history.

13. The method of claim 1 further comprising:
  receiving a vehicle characteristic; and
  determining the amount of energy to be consumed by the vehicle based on the vehicle characteristic.

14. The system of claim 6 wherein the processor is configured to:
  receiving a vehicle characteristic; and
  determine the amount of energy to be consumed by the vehicle based on the vehicle characteristic.

15. The non-transitory computer readable medium of claim 10 wherein the instructions thereon, when executed by one or more computer processors, further cause the one or more computer processors to:
  receiving a vehicle characteristic; and
  determine the amount of energy to be consumed by the vehicle based on the vehicle characteristic.

16. The method of claim 1, wherein the characteristic of the at least two battery compartments indicates that the at least two batteries are positioned in tandem.

17. The system of claim 6, wherein the characteristic of the at least two battery compartments indicates that the at least two batteries are positioned in tandem.

18. The non-transitory computer readable medium of claim 10, wherein the characteristic of the at least two battery compartments indicates that the at least two batteries are positioned in tandem.

\* \* \* \* \*